US007854295B2

(12) United States Patent
Kakuhari

(10) Patent No.: US 7,854,295 B2
(45) Date of Patent: Dec. 21, 2010

(54) ACTIVE NOISE CONTROL SYSTEM

(75) Inventor: Isao Kakuhari, Nara (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/475,768

(22) Filed: Jun. 1, 2009

(65) Prior Publication Data

US 2009/0301805 A1 Dec. 10, 2009

(30) Foreign Application Priority Data

Jun. 3, 2008 (JP) ............................. 2008-145305

(51) Int. Cl.

*F01N 1/06* (2006.01)
*F16F 15/03* (2006.01)
*G10K 11/178* (2006.01)
*F01N 1/00* (2006.01)
*F16F 7/00* (2006.01)
*F16F 15/02* (2006.01)
*G10K 11/16* (2006.01)

(52) U.S. Cl. ....................... 181/206; 181/207; 181/208; 381/71.2

(58) Field of Classification Search ................. 181/206, 181/207, 208; 381/71.2, 71.3, 71.7
See application file for complete search history.

(56) References Cited

U.S. PATENT DOCUMENTS 5,315,661 A * 5/1994 Gossman et al. ........... 381/71.1
5,485,053 A * 1/1996 Baz ............................ 310/326
5,548,653 A * 8/1996 Pla et al. ..................... 381/71.2
5,617,479 A * 4/1997 Hildebrand et al. ........ 381/71.3
5,692,053 A * 11/1997 Fuller et al. ................ 381/71.3
5,724,432 A * 3/1998 Bouvet et al. .............. 381/71.1
5,828,768 A * 10/1998 Eatwell et al. .............. 381/333
5,838,092 A * 11/1998 Wang et al. ................. 310/326
6,031,917 A * 2/2000 Mathur .................... 381/71.11
6,178,246 B1 * 1/2001 Bebesel et al. ............. 381/71.2
6,192,133 B1 * 2/2001 Enamito et al. ............ 381/71.5
6,546,316 B2 * 4/2003 dell'Isola et al. ............ 700/280
6,851,930 B2 * 2/2005 Pal ................................ 416/1
6,985,596 B2 * 1/2006 Bank et al. .................. 381/152
7,068,794 B2 * 6/2006 Kim .......................... 381/71.7
7,539,459 B2 * 5/2009 Steer ....................... 455/67.11

(Continued)

FOREIGN PATENT DOCUMENTS

JP 05-086658 4/1993

(Continued)

*Primary Examiner*—Edgardo San Martin
(74) *Attorney, Agent, or Firm*—Wenderoth, Lind & Ponack, L.L.P.

(57) ABSTRACT

An active noise control apparatus and an active noise control system for reducing noise using an active vibrator, such that edges β of the vibrator (i.e. genesis locations of a bending moment of force caused by the vibrator) agree with positions α on a distribution of the bending moment of force caused by noise vibration of a panel, and such that the edges β of the vibrator are aligned with the positions α on the panel where a sign, of the distribution of the bending moment of force over the panel caused by the noise vibration, reverses. As a result, a control vibration approximate to the noise vibration can be excited. Accordingly, when the vibrator is fixed by agreeing the edges β of the vibrator with the positions α determined by noise frequency desired to be reduced, noise due to a target noise frequency can be effectively reduced.

12 Claims, 25 Drawing Sheets

U.S. PATENT DOCUMENTS

| | | | | |
|---|---|---|---|---|
| 2004/0057584 | A1 * | 3/2004 | Kakuhari et al. | 381/71.2 |
| 2007/0125592 | A1 * | 6/2007 | Michell et al. | 181/206 |
| 2008/0089528 | A1 * | 4/2008 | Klossowski | 381/71.3 |
| 2009/0301805 | A1 * | 12/2009 | Kakuhari | 181/206 |

FOREIGN PATENT DOCUMENTS

| | | |
|---|---|---|
| JP | 06-012081 | 1/1994 |
| JP | 06-149271 | 5/1994 |
| JP | 2006-215993 | 8/2006 |

* cited by examiner (a) SIDE VIEW (b) PERSPECTIVE VIEW

ACTIVE NOISE CONTROL SYSTEM

BACKGROUND OF THE INVENTION

1. Field of the Invention

The present invention relates to an active noise control apparatus and an active noise control system using the active noise control apparatus which reduces noise by actively controlling vibration, for achieving a beneficial effect of sound insulation.

2. Description of the Related Art

Conventionally, Japanese Laid-Open Patent Publication No. 5-86658 (Patent Document 1) discloses a technique for satisfying a noise insulation performance over a wide frequency range. FIG. 25 illustrates the technique described in Patent Document 1. In FIG. 25, a composite sound insulator 51 includes a surface plate 52 and a damping material 53 having a large loss coefficient (0.2 and above) which is stacked on the rear surface of the surface plate 52. A sound insulation wall is formed by placing the composite sound insulator 51 on a wall surface.

In addition, Japanese Laid-Open Patent Publication No. 6-149271 (Patent Document 2) discloses a conventional technique for actively controlling noise. FIG. 26 illustrates the technique described in Patent Document 2. In FIG. 26, a conversion circuit 65 converts electrical signals obtained by a plurality of vibration sensors 63 into acoustic power which is radiated from a sound insulation wall 61. A control circuit 66 generates a control signal for reducing an output signal of the conversion circuit 65, from an output of a noise sensor 64 and a conversion output of the conversion circuit 65, and outputs the generated control signal to an actuator 62. With this configuration, the actuator 62 suppresses vibration detected by the vibration sensor 63, so that noise can be reduced.

Further, Japanese Laid-Open Patent Publication No. 6-12081 (Patent Document 3) discloses a conventional technique for actively controlling vibration of a panel by using a piezoelectric material as a vibrator. FIG. 27 illustrates the technique described in Patent Document 3. In FIG. 27, vibration sensors 75 and 76 respectively detect vibration excited on first and second panels 71 and 72 by incoming noise from a noise source n. A controller 74 outputs, based on signals inputted from the first and second vibration sensors 75 and 76, a signal for suppressing the vibration of the second panel 72, and applies the suppressing signal to a piezoelectric element 73 via the first and second panels 71 and 72. With this configuration, since the piezoelectric element 73 vibrates in proportion to an applied voltage to suppress the vibration of the second panel 72, noise can be reduced.

Further, Japanese Laid-Open Patent Publication No. 2006-215993 (Patent Document 4) discloses a conventional technique for actively controlling vibration of a panel by using a piezoelectric material as a vibrator. FIG. 28 illustrates the technique described in Patent Document 4. In FIG. 28, a detector 81 detects acceleration generated at a panel 84. A control section 83 generates, based on a signal detected by the detector 81, a control signal for suppressing a noise signal from the panel 84, and outputs the control signal to a vibrator 82. The vibrator 82 attached to the panel 84 transmits its distortion to the panel 84 in accordance with the control signal from the control section 83. With this configuration, since the detector 81 is placed on the panel 84 in a region where the direction of an initial displacement when the control signal is inputted to the vibrator 82 coincides with the direction of a stationary displacement, a control system can be stabilized even when a high gain feedback control is applied, and a vibration suppression effect can be obtained over a wide frequency range.

However, the technique described in the above-mentioned Patent Document 1 has a problem that it is necessary to ensure a large loss coefficient by using a heavy material as a damping material in order to achieve an excellent sound insulation property against noise over a wide frequency range.

In addition, in the technique described in the above-mentioned Patent Document 2, since point vibration is performed by the actuator 62, when a vibration frequency becomes higher, a region in which vibration can be suppressed becomes limited to be just below and near the actuator 62. Accordingly, numerous vibration sensors and actuators become necessary in order to suppress vibration against noise over a wide frequency range. This causes a problem that the size of a control circuit becomes larger.

Further, the techniques described in the above-mentioned Patent Documents 3 and 4 have a problem that since the vibration of the panel, on which the detector is disposed, is reduced by the vibrator, it is necessary to adjust the size of the panel depending on a frequency of noise to be controlled.

BRIEF SUMMARY OF THE INVENTION

Therefore, an object of the present invention is to provide an active noise control apparatus and an active noise control system which can achieve an advantageous sound insulation effect over a wide frequency range, by adjusting the position of the vibrator without increasing the size of the apparatus.

To achieve the above-described object, the present invention is directed to an active noise control apparatus for suppressing noise vibration of a panel generated by noise radiated from a noise source. To achieve the above-described object, the active noise control apparatus of the present invention includes a flat-plate vibrator, which is fixed to the panel, for exciting control vibration, at the panel, having a vibration direction opposite to a vibration direction of the noise vibration, in accordance with a control signal, a detector for detecting either a propagation sound generated by the noise vibration of the panel or the vibration of the panel, and a control section for generating, based on a result detected by the detector, the control signal causing the vibrator to excite the control vibration for suppressing the noise vibration of the panel. The vibrator is disposed in a manner that edges of the vibrator respectively agree with positions where the sign, of the distribution of bending moment of force over the panel caused by the noise vibration, is reversed.

Further, a plurality of vibrators may be disposed on the panel. In such a case, each of the plurality of vibrators is disposed in a manner that edges of each of the plurality of vibrators respectively agree with positions where the sign, of the distribution of bending moment of force over the panel caused by the noise vibration which is excited based on one of frequencies included in the noise, is reversed.

It is preferable that the vibrator is disposed in a manner that that edges of the vibrator respectively agree with positions, the positions being the outermost positions among positions on the panel where the sign, of the distribution of bending moment of force over the panel caused by the noise vibration, is reversed. The detector may further detect either noise radiated from the noise source or vibration of the noise source. The typical vibrator is formed of a piezoelectric material exhibiting a dynamic change according to the control signal.

The active noise control apparatus can be modularized together with a flat-plate panel whose periphery is fixed in a frame. When a plurality of modules is arranged in a matrix, an active noise control panel can be constructed. In addition, when the active noise control panel is disposed between neighboring rooms, wherein audio-video equipment is disposed in one of the rooms, and the detector detects sound signal of the audio-video equipment, an active noise control system including the audio-video equipment can be constructed by using the active noise control apparatus.

Further, an active noise control system including a laundry machine can be constructed by using the active noise control apparatus when the vibrator is fixed to a cabinet panel of the laundry machine, and the detector detects sound or vibration from a motor of the laundry machine which is the noise source, and from the cabinet panel of the laundry machine.

According to the present invention, an active noise control apparatus can be attained which can achieve an advantageous sound insulation effect over a wide frequency range without increasing the size of the apparatus.

These and other objects, features, aspects and advantages of the present invention will become more apparent from the following detailed description of the present invention when taken in conjunction with the accompanying drawings.

DETAILED DESCRIPTION OF THE INVENTION

First Embodiment

Figure 1:
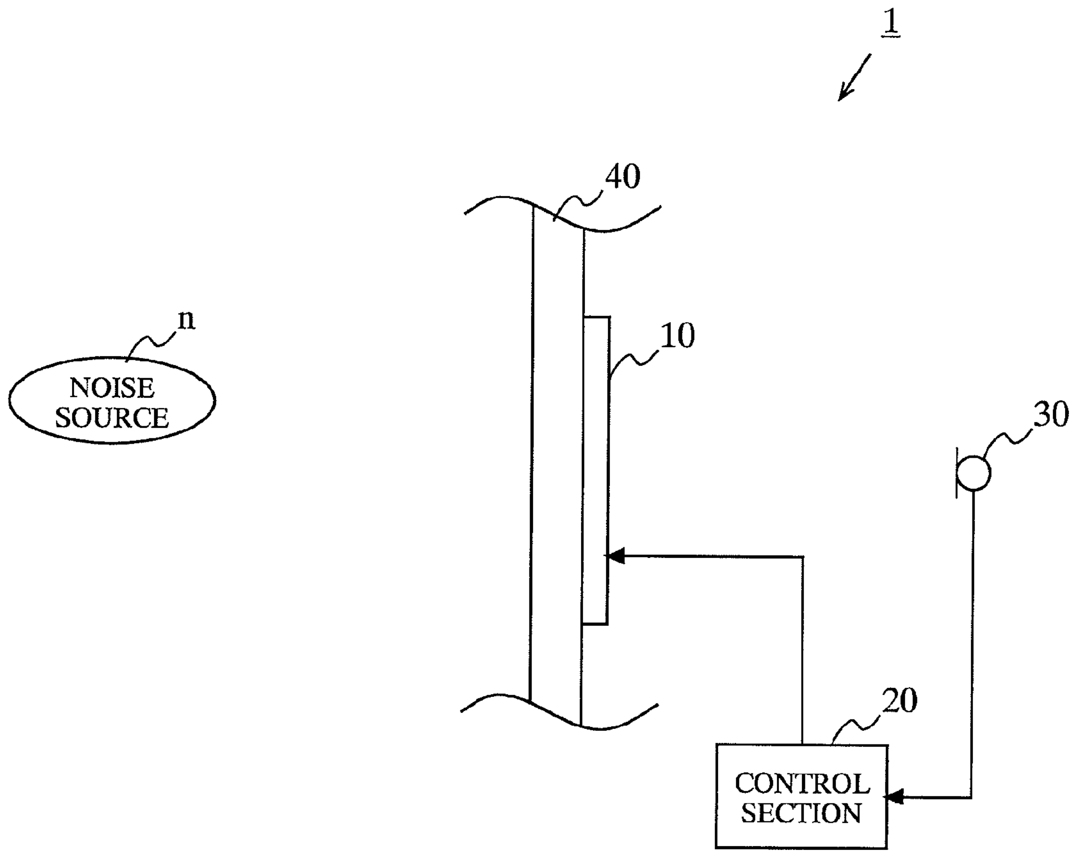
FIG. 1 and FIG. 14 illustrate a configuration of an active noise control apparatus 1 according to a first embodiment.

FIG. 1 illustrates a configuration of an active noise control apparatus 1 according to a first embodiment of the present invention. As shown in FIG. 1, the active noise control apparatus 1 according to the first embodiment includes a vibrator 10, a control section 20, and a detector 30. A panel 40 is a target object of reducing noise vibration caused by a noise source n. For example, a wall easy to vibrate, a cabinet of an electrical appliance, and the like, are considered as the panel 40.

The vibrator 10 is thin flat-plate shaped and fixed to the panel 40, for example, by being attached to a surface of the panel 40. For the vibrator 10, ceramic such as lead zirco titanate, which becomes distorted when an electric field is applied to crystal, or a piezoelectric material typified by polymer resin such as polyvinylidene-fluoride, for example, is used. The detector 30 is arranged at a predetermined position across the panel 40 from the noise source n.

An operation of the active noise control apparatus 1 according to the first embodiment will be described below.

Noise radiated from the noise source n enters the panel 40 and vibration (hereinafter, referred to as noise vibration) is excited on the panel 40 due to the noise. Sound is radiated from the panel 40 due to the noise vibration, and as a result, noise caused by the noise source n is propagated to the detector 30. The detector 30 detects the propagation sound radiated from the panel 40, and outputs to the control section 20 a detection signal in proportion to the detected level of the propagation sound. The control section 20 generates a control signal (electric signal) for reducing the detection signal detected by the detector 30 and outputs the control signal to the vibrator 10. The vibrator 10 becomes distorted in a direction along the surface thereof according to the control signal inputted from the control section 20, and excites control vibration at the panel 40 in a vibration direction opposite to that of the noise vibration.

Figure 2:
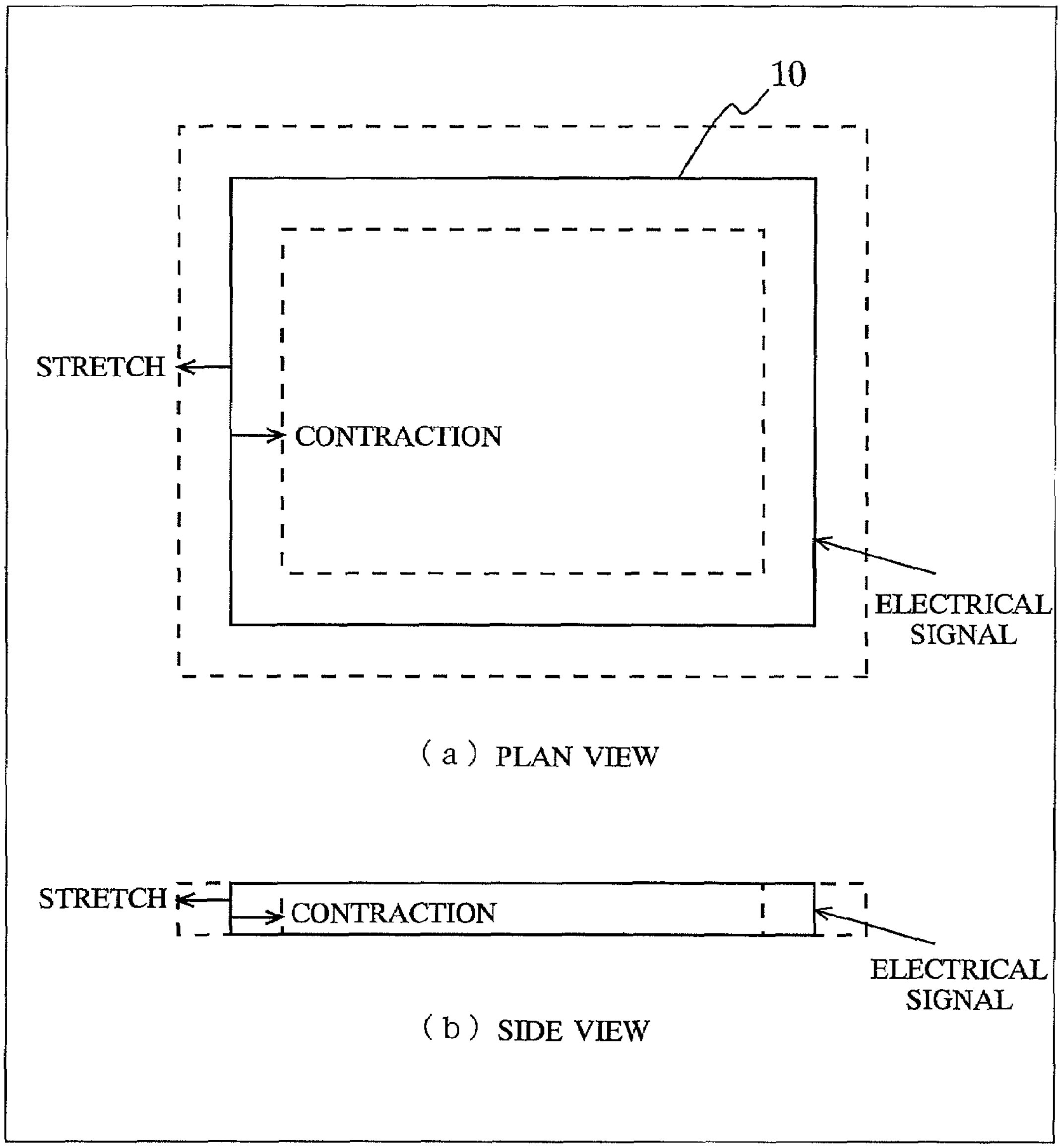
FIG. 2 illustrates mechanical alterations of a vibrator 10.
Figure 3:
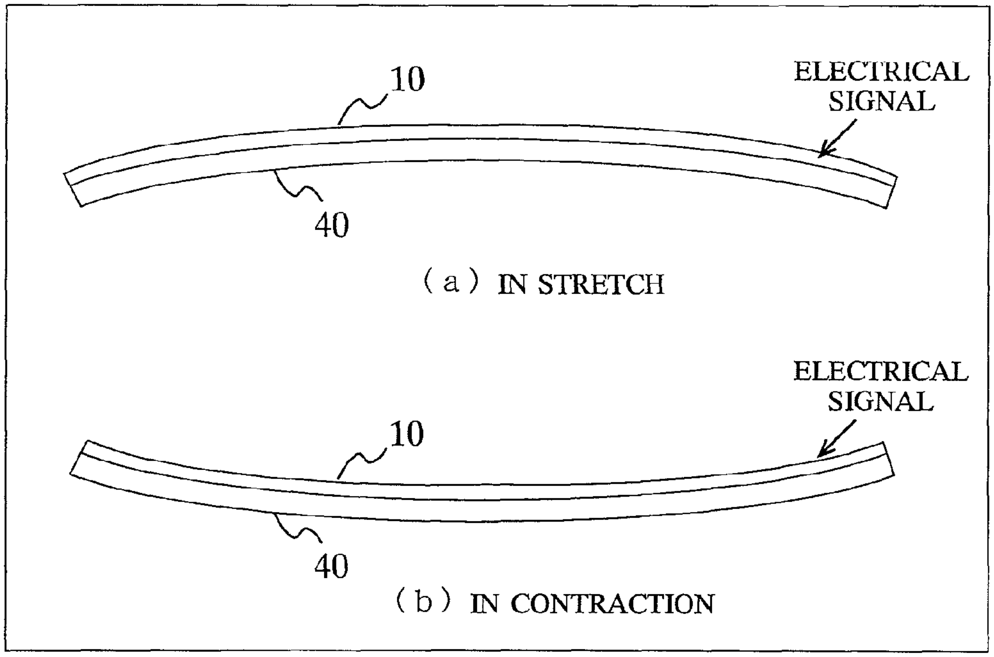
FIG. 3 illustrates mechanical alterations of a panel 40 to the surface of which the vibrator 10 is fixed.
Figure 4:
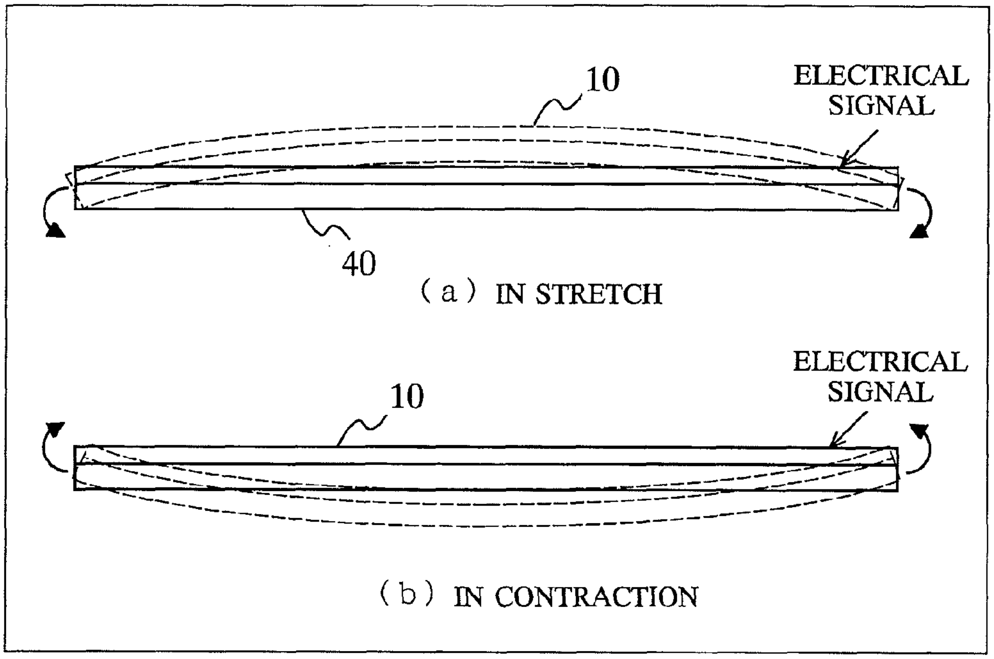
FIG. 4 illustrates bending moments of force generated at edges of the vibrator 10 fixed to the panel 40.

FIG. 2 illustrates mechanical alterations of the vibrator 10. FIG. 3 illustrates mechanical alterations of the panel 40 to the surface of which the vibrator 10 is fixed. FIG. 4 illustrates bending moments of force at edges of the vibrator 10.

The vibrator 10 becomes distorted in the direction along the surface thereof, that is, stretches or contracts according to a level of the supplied electric signal (FIG. 2). Accordingly, when the vibrator 10 attached to the panel 40 stretches, the panel 40 becomes distorted in a shape convexly curved on the side of the vibrator 10 ((a) of FIG. 3). On the contrary, when the vibrator 10 attached to the panel 40 contracts, the panel 40 becomes distorted in a shape concavely curved on the side of the vibrator 10 ((b) of FIG. 3). In this manner, when the vibrator 10 becomes distorted, vibration can be excited on the panel 40.

Exciting force from the vibrator 10 to the panel 40 can be represented by bending moments of force at edges of the vibrator 10 as indicated by arrows in FIG. 4. Accordingly, the vibration caused by bending moments of force can be excited at any position on the panel 40 by adjusting the positions of the edges of the vibrator 10 relative to the panel 40.

Next, preferred arrangement of the vibrator 10 for generating the control vibration approximate to the noise vibration of the panel 40 caused by the noise will be described. At first, in order to readily appreciate the principle, the case where the panel 40 is beam shaped is described.

Figure 5:
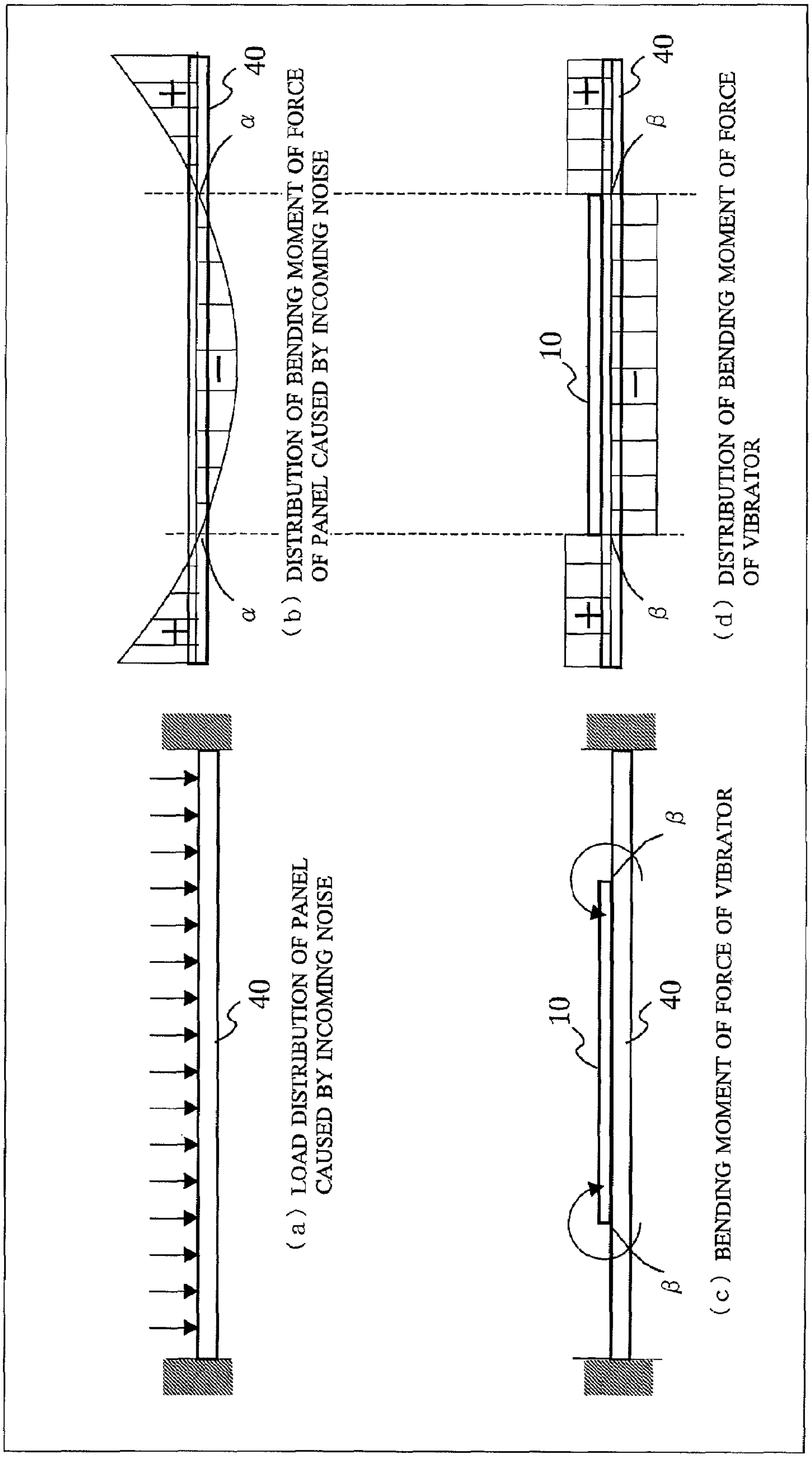
FIG. 5 illustrates a relation between a weighted state and distributions of bending moment of force of a beam shaped panel 40.

When a frequency of the noise is low, the excitation of the vibration on the panel 40 caused by the incoming noise can be regarded as a uniformly-distributed load as shown in (a) of FIG. 5. When both edges of the panel 40 are fixed, the bending moment of force at the panel 40 exhibits a distribution as shown in (b) of FIG. 5, for example. That is, the vibration is excited on the panel 40 by application of the bending moments of force caused by the incoming noise as shown in (b) of FIG. 5, for example. On the other hand, the vibrator 10 fixed to the panel 40 excites the vibration on the panel 40 by the bending moments of force generated at edges β of the vibrator 10 as shown in (c) of FIG. 5. At that time, the bending moment of force generated at the panel 40 exhibits such a distribution as shown in (d) of FIG. 5, for example.

Accordingly, by making the edges β of the vibrator 10, that is, genesis locations β of the bending moments of force caused by the vibrator 10, agree with positions a where the sign of the distribution of bending moment of force over the panel 40 caused by the noise vibration is reversed (relation between (b) of FIG. 5 and (d) of FIG. 5), the control vibration approximate to the noise vibration can be excited. That is, when the vibrator 10 is fixed so as to make the edges β agree with the positions a of the panel 40 determined based on the noise frequency (target noise frequency) which is desired to be reduced, the noise caused at the target noise frequency can be effectively suppressed.

Figure 6:
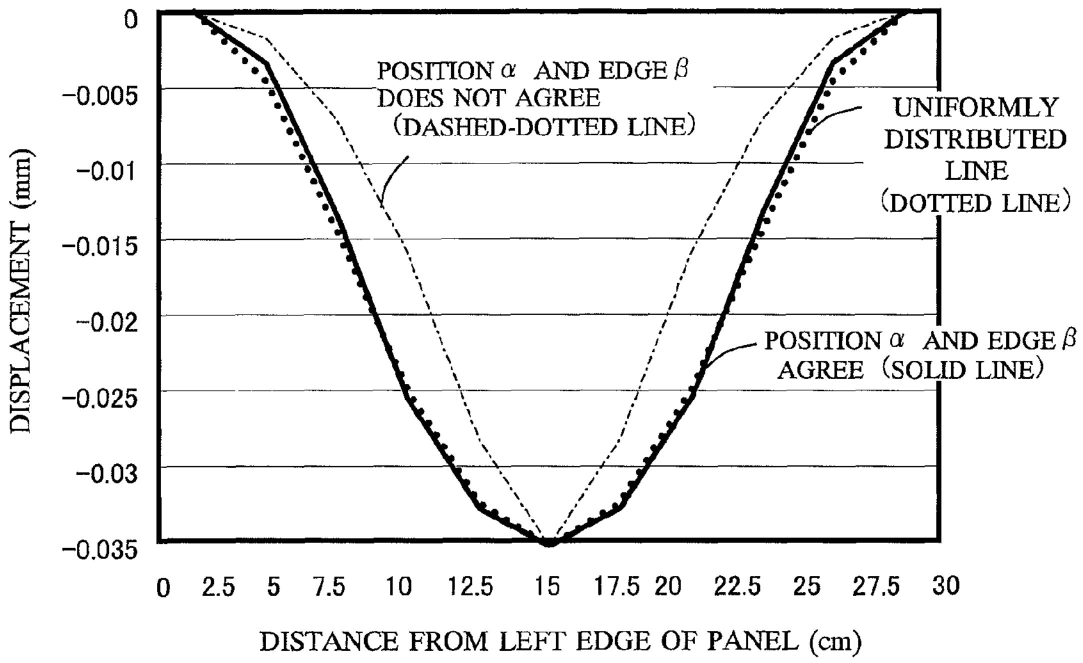
FIG. 6 illustrates an example of displacements of the beam shaped panel 40 depending on differences in vibration conditions.

FIG. 6 illustrates displacements of the panel 40 depending on differences in vibration conditions. The panel 40 is formed of a stainless plate measuring 30 cm in length, 1 cm in width, and 0.5 mm in thickness, and analysis is performed under the condition of applying a dead load. It can be seen that the displacement distribution (solid line) when the genesis locations β of the bending moment of force by the vibrator 10 agree with the positions α where the sign, of the distribution of bending moment of force caused by the noise vibration, is reversed, approximates the displacement distribution (dotted line) of the panel 40 by application of the uniformly-distributed load. On the other hand, the displacement distribution (dashed-dotted line) when the genesis locations β and the positions α do not agree (±2.5 cm apart in an example shown in FIG. 6), does not approximate the displacement distribution (dotted line) of the panel 40 by application of the uniformly-distributed load.

Figure 7:
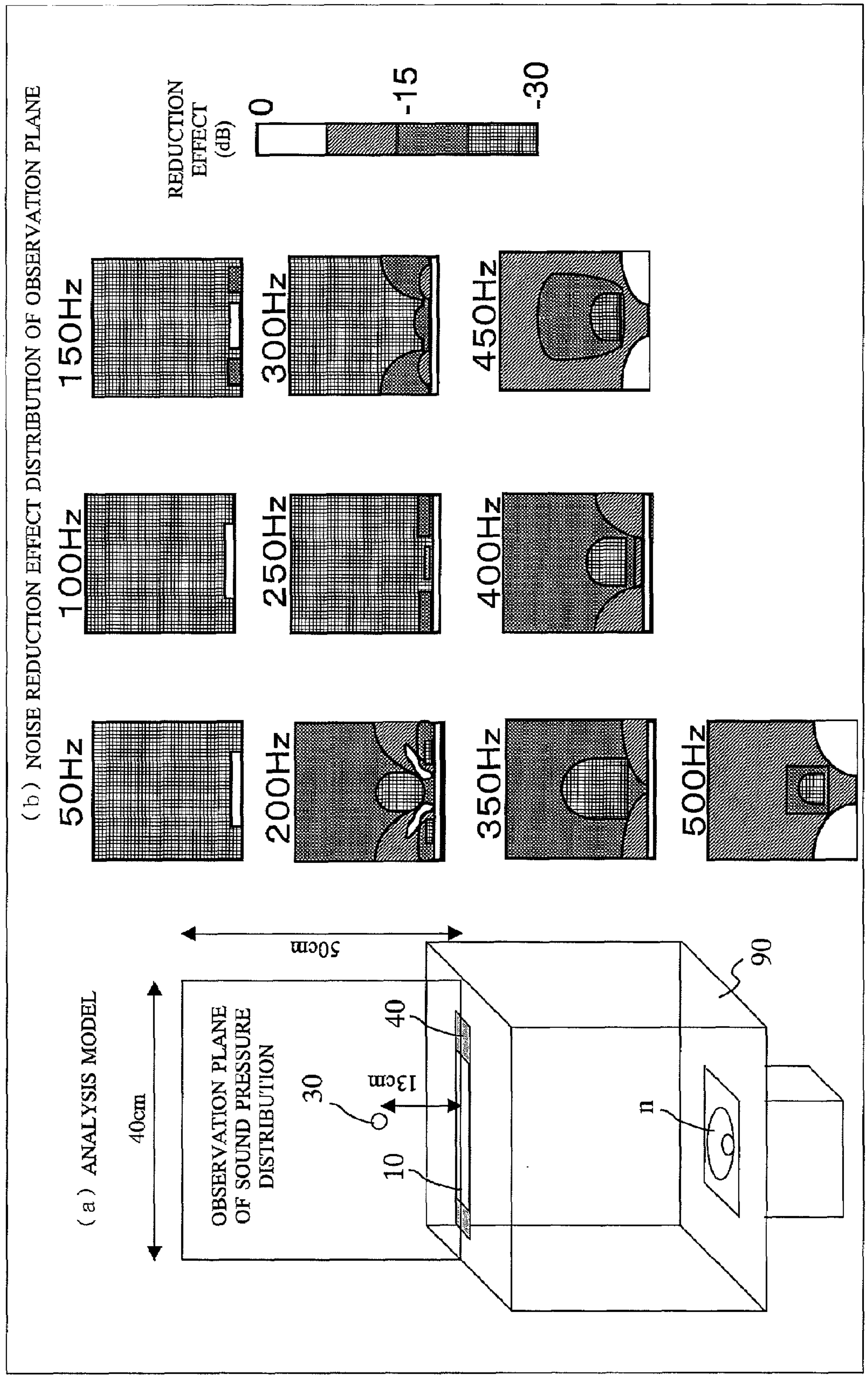
FIG. 7 illustrates an example of a noise reduction effect on the beam shaped panel 40.

FIG. 7 illustrates an example of a noise reduction effect, under conditions that noise is radiated from a noise source in a sound proof box 90 in which the noise source n is disposed on the bottom surface of the sound proof box 90 and a beam shaped panel 40 is disposed on an area of the upper surface of the sound proof box 90, and in the case where the vibrator 10 is disposed in a manner that the edges β agree with the positions α where the sign, of the distribution of bending moment of force caused by the noise vibration, is reversed, and control vibration for the panel 40 is excited so as to cancel the noise at the detector 30. Note that the panel 40 is formed of a stainless plate with the above-described size, the sound proof box 90 is a rectangular solid measuring 36 cm in width, 31 cm in depth, and 33 cm in height, and the distance from the panel 40 to the detector 30 measures 13 cm. As a result of analysis, by approximating the noise vibration of the panel 40 with the control vibration, the wavefront of the noise radiated from the noise source n becomes approximate to the wavefront of a control sound radiated from the panel 40. Accordingly, a noise reduction effect over a wide range including the position of the detector 30 can be achieved.

Next, the case where a planar panel 40 is used will be described.

Figure 8:
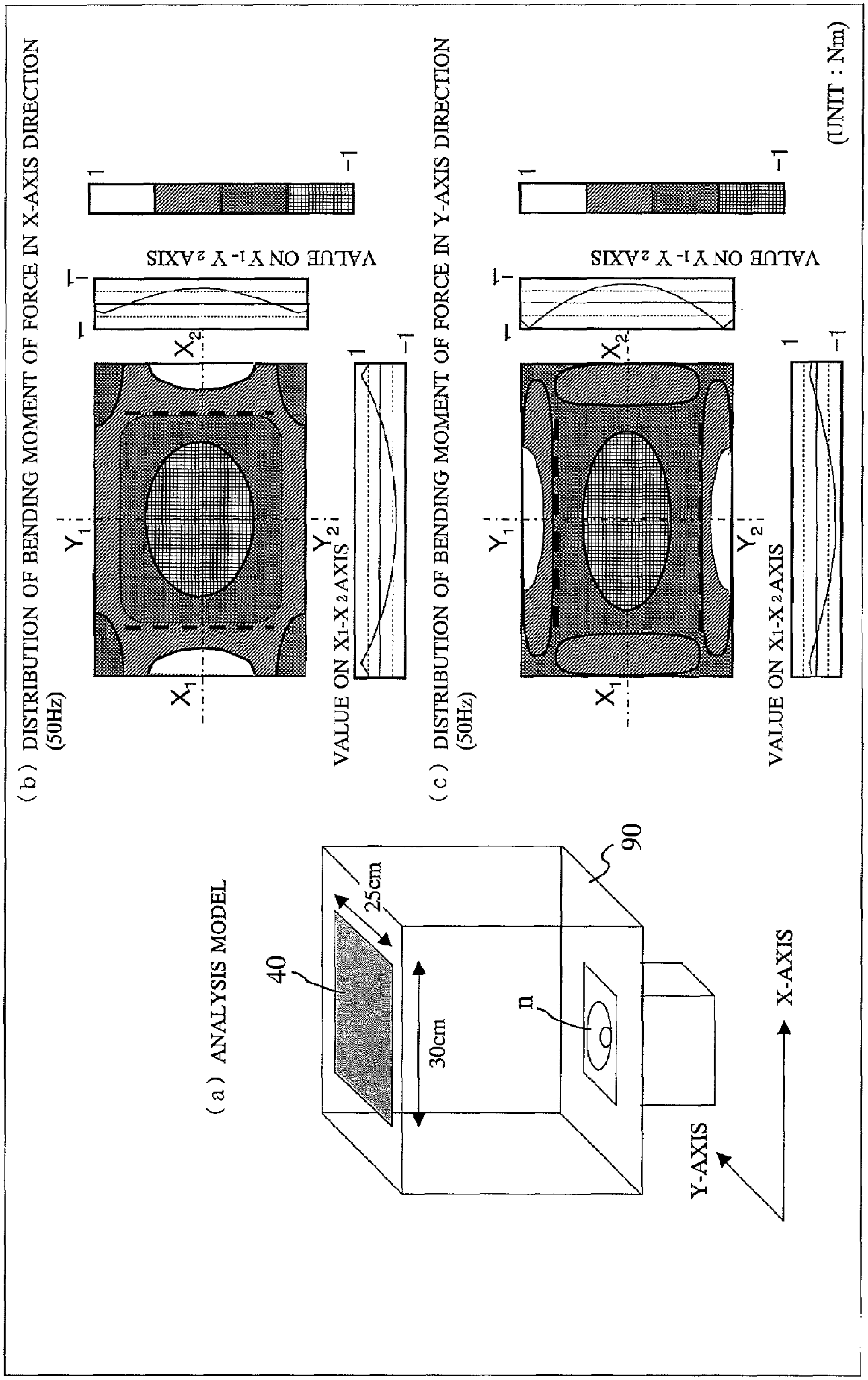
FIG. 8 and FIG. 11 illustrate an example of distributions of bending moment of force over a planar panel 40.

FIG. 8 illustrates a distribution chart of bending moment of force over the panel 40 under conditions that noise is radiated from a noise source n in a sound proof box 90 in which the noise source n is disposed on the bottom surface of the sound proof box 90 and the planar panel 40 is disposed on an area of the upper surface of the sound proof box 90. Note that the sizes of the panel 40 and the sound proof box 90 are equivalent to the above-described sizes. In (b) and (c) of FIG. 8, positions indicated by dotted lines correspond to the positions α where the sign of the distribution of bending moment of force is reversed.

Figure 9:
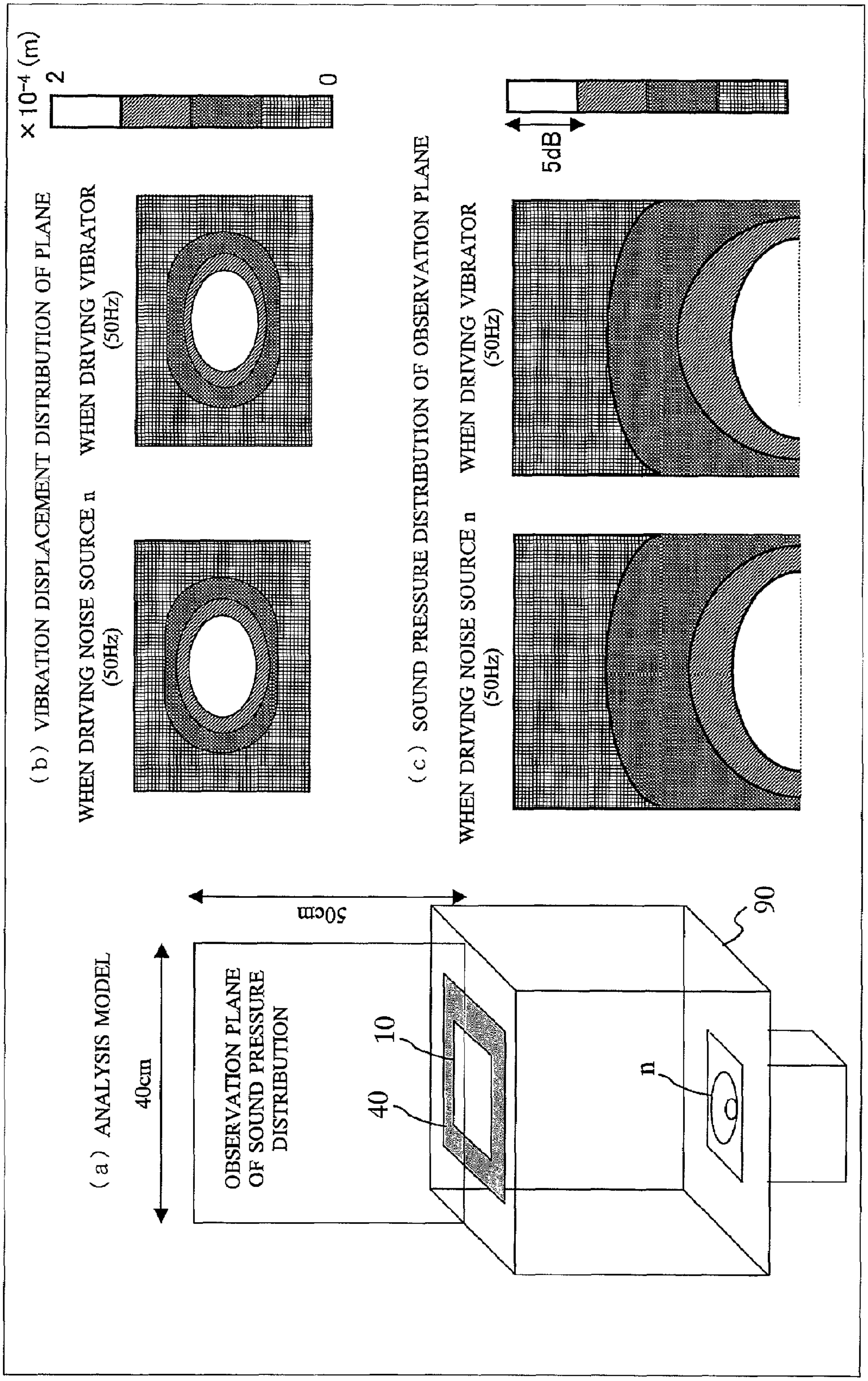
FIG. 9 and FIG. 12 illustrate an example of a displacement distribution of vibration and a sound pressure distribution over the planar panel 40.

FIG. 9 illustrates an analysis result in the case where the sound proof box 90 is configured in a manner that the vibrator 10 is disposed on the panel 40 along the dotted lines shown in FIG. 8. (b) of FIG. 9 illustrates vibration displacement distributions of the panel 40 in the case where noise having a frequency of 50 Hz irradiated from the noise source n only enters and in the case where only the vibrator 10 becomes distorted by a sine wave signal having a frequency of 50 Hz. (c) of FIG. 9 illustrates sound pressure distributions of sounds irradiated from the panel 40. As described above, also in the planar panel 40, a control signal where a vibration displacement distribution approximates sound pressure distribution can be obtained, by making the genesis locations β of the bending moment of force caused by the vibrator 10 agree with the positions α where the sign, of the distribution of bending moment of force over the panel 40 caused by the noise vibration, is reversed.

Figure 10:
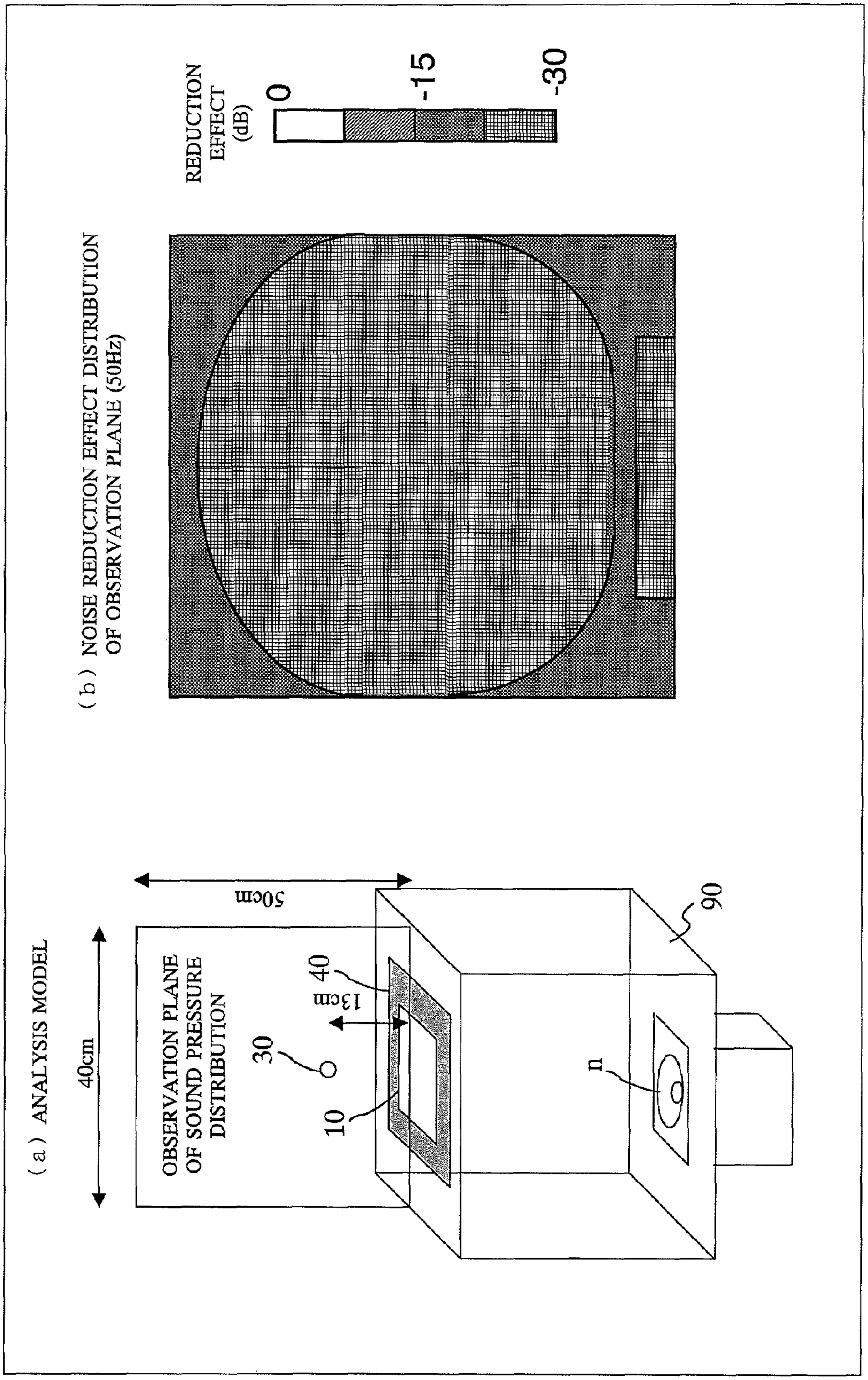
FIG. 10 and FIG. 13 illustrate an example of a noise reduction effect distribution over the planar panel 40.

FIG. 10 illustrates a noise reduction effect under conditions that noise having a frequency of 50 Hz is radiated from a noise source n in a sound proof box 90 in which the noise source n is disposed on the bottom surface of the sound proof box 90 and the planar panel 40 is disposed on an area of the upper surface of the sound proof box 90, and in the case where the vibrator 10 is disposed in a manner that the positions of edges β agree with positions α where the sign, of the distribution of bending moment of force caused by the noise vibration, is reversed, and control vibration for the panel 40 is excited so as to cancel the noise at the position of the detector 30. Note that various conditions are equivalent to those described above. As an analysis result, a noise reduction effect over a wide range including the position of the detector 30 can be achieved.

Figure 11:
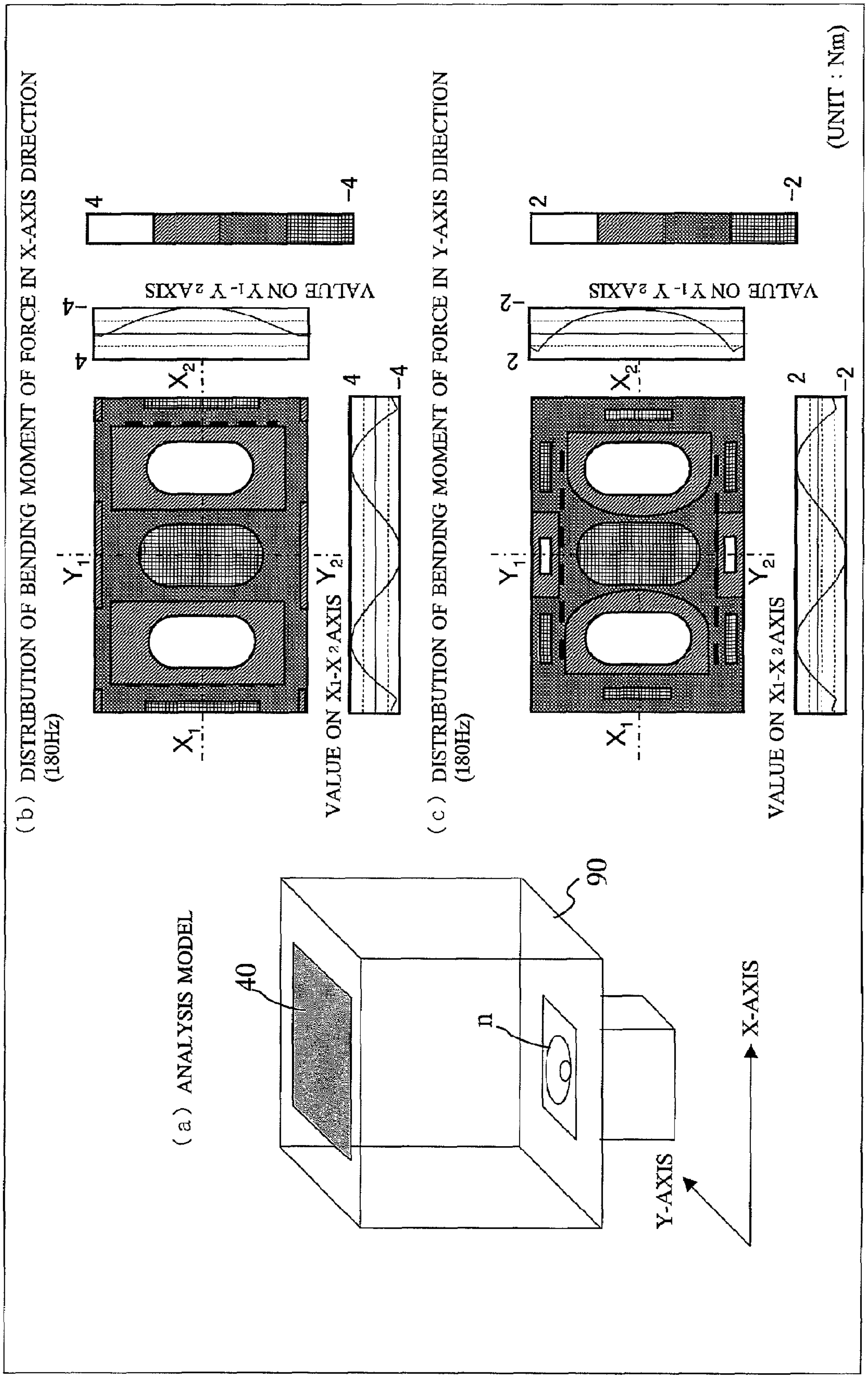
Figure 12:
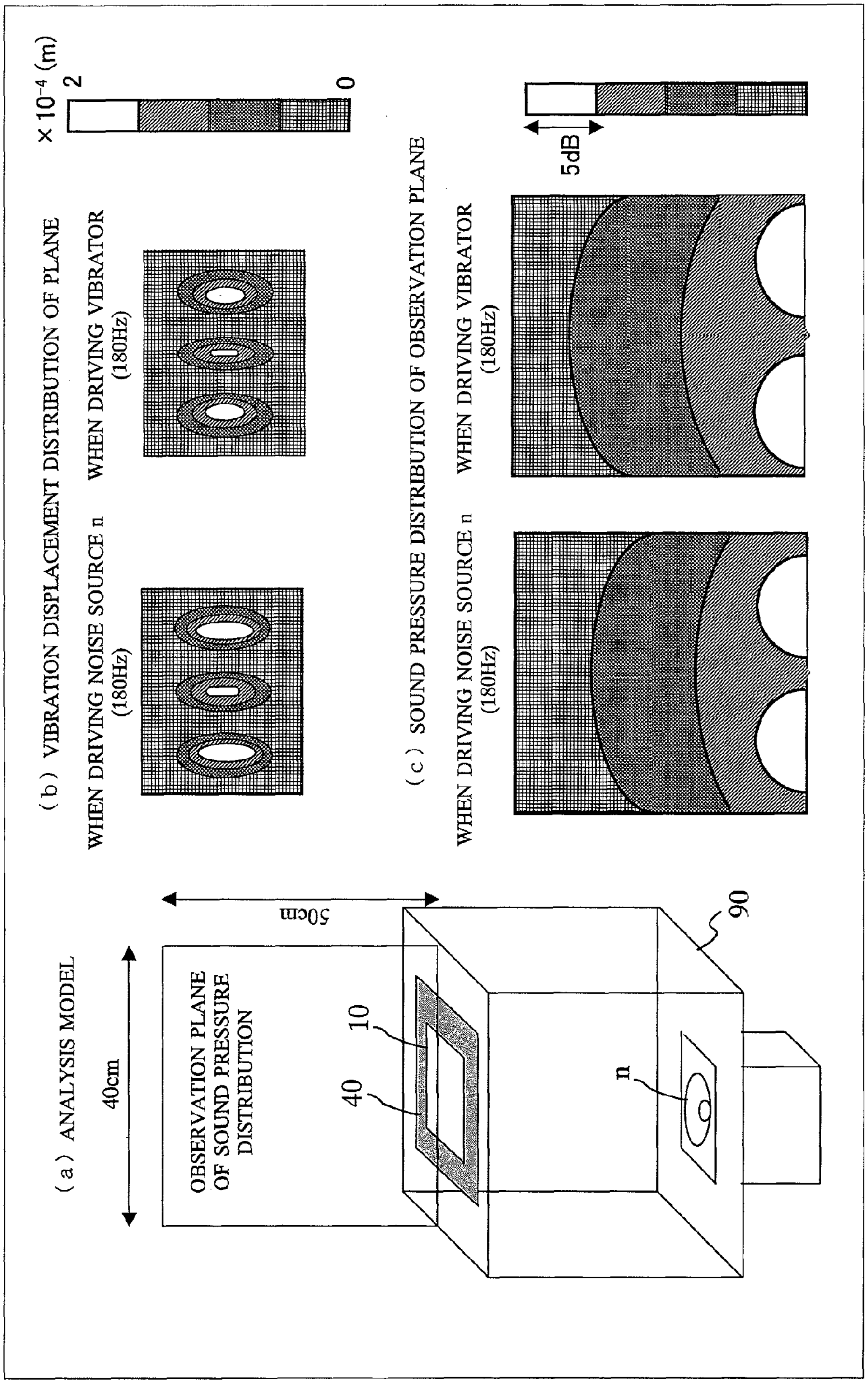
Figure 13:
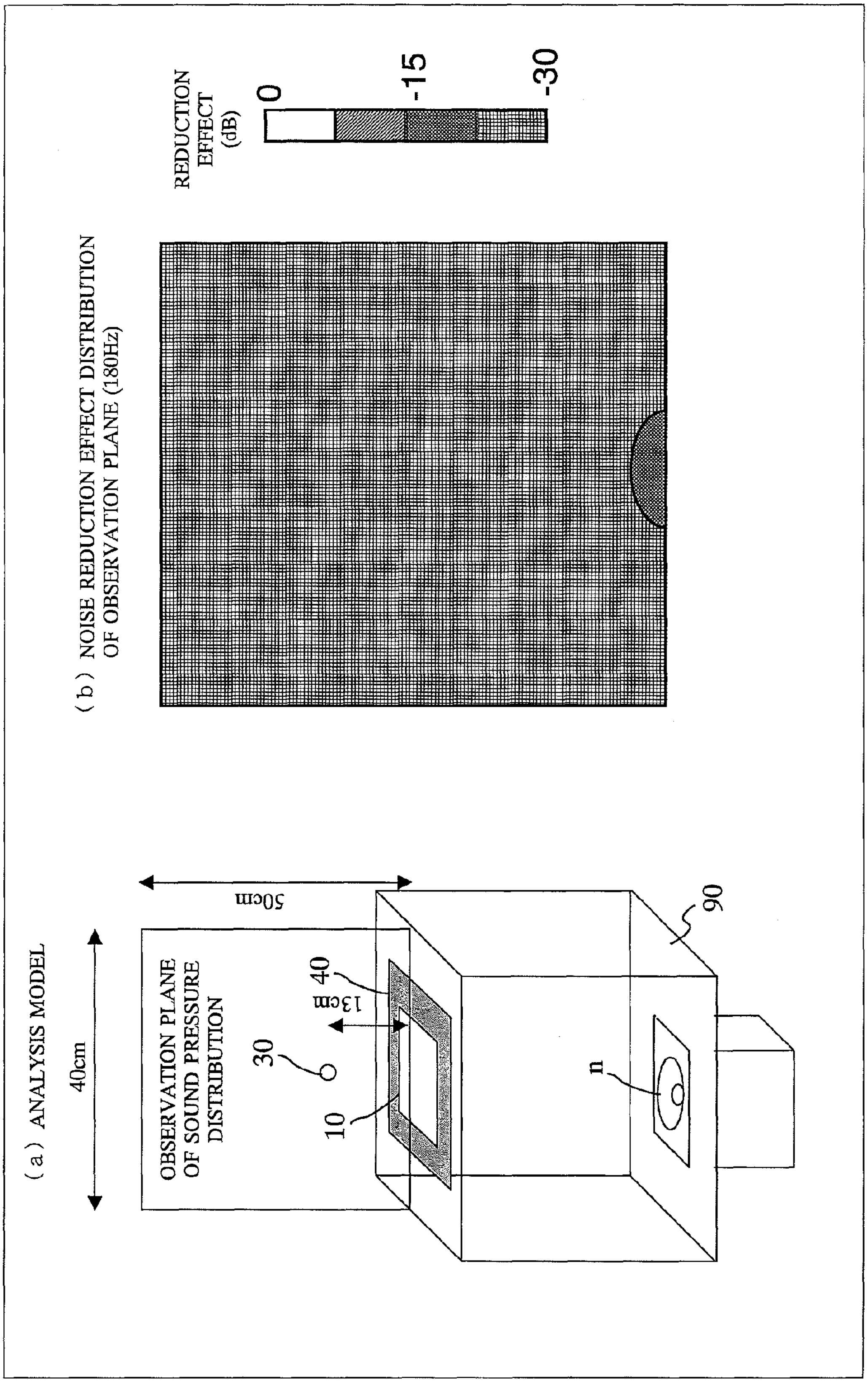

Similarly, FIGS. 11 to 13 illustrate analysis results under conditions that noise having a frequency of 180 Hz is radiated from the noise source n in the sound proof box 90.

The bending moment of force over the panel 40 may be obtained from measurement or analysis, or may be obtained in accordance with the following formulas. The bending moments of force in an x-axis direction and in a y-axis direction at any position on a two-dimensional flat plate such as the panel 40 can be obtained as is well known in accordance with the following formulas.

$$Mx = -D\left[\frac{\partial^2 w}{\partial x^2} + v\frac{\partial^2 w}{\partial y^2}\right] \tag{1}$$

$$My = -D\left[\frac{\partial^2 w}{\partial y^2} + v\frac{\partial^2 w}{\partial x^2}\right] \tag{2}$$

Here, D represents the flexural rigidity of the plate and is expressed by the following formula (3).

$$D = \frac{Eh^3}{12(1 - v^2)} \tag{3}$$

Note that w: displacement of the plate, v: Poisson ratio, E: Young's modulus, h: plate thickness.

The curvature in the formulas (1) and (2) can be converted as follows.

$$\frac{\partial^2 w}{\partial x^2} = \frac{\partial}{\partial x}\left(\frac{\partial w}{\partial x}\right) = \frac{\partial}{\partial x}(-\tan\theta_y) \tag{4}$$

$$\frac{\partial^2 w}{\partial y^2} = \frac{\partial}{\partial y}\left(\frac{\partial w}{\partial y}\right) = \frac{\partial}{\partial y}(\tan\theta_x) \tag{5}$$

Here, θx and θy represent the rotational angles of positions at which the bending moments of force are calculated, respectively.

That is, the position where the sign of the distribution of bending moment of force is reversed, as described in the embodiment, can be the position on the distribution of bending moment of force in which the rotational angle is near zero and the rotational directions of neighboring regions on both sides are opposite to each other. The magnitude and direction of the rotational angle can be calculated, for example, from displacements and phases of two adjacent positions or more. As described above, in order to achieve a favorable noise reduction effect by using the active noise control apparatus 1 of the first embodiment, it is not necessary to directly specify the bending moment of force. The optimum location of the vibrator 10 can be derived, for example, from the value of the rotational angle or the like at every position on the panel 40.

As described above, the active noise control apparatus 1 according to the first embodiment of the present invention can effectively reduce the noise having the target noise frequency by adjusting the position to fix the vibrator 10 without increasing the size of the apparatus.

Figure 14:
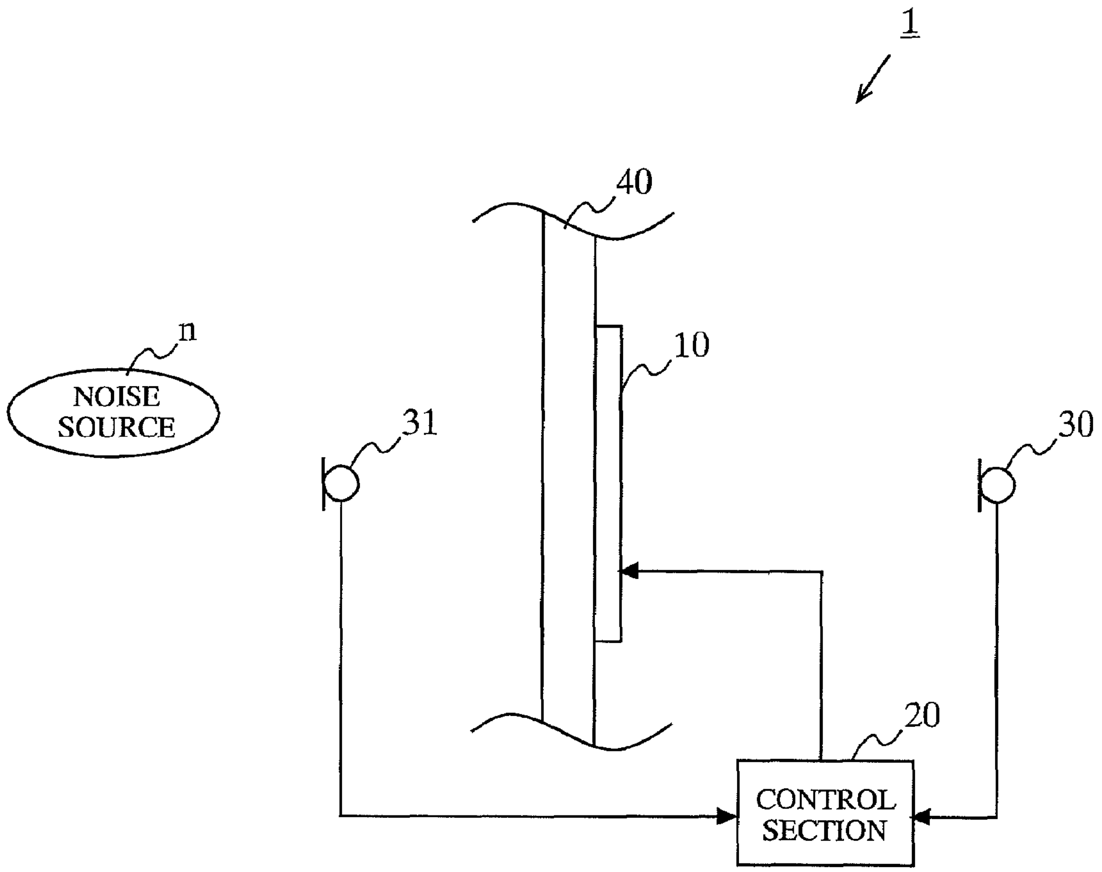

Note that an example of a feedback configuration where the detector 30 being arranged at the opposite position across the panel 40 from the noise source n is described in the above-described embodiment. However, a feedforward configuration as illustrated in FIG. 14 can be employed where a detector 31, for detecting noise radiated from the noise source n and outputting a detection signal in proportional to the level of the detected noise to the control section 20, is additionally provided between the noise source n and the panel 40.

Second Embodiment

The active noise control apparatus 1 according to the above-described first embodiment has a configuration where one vibrator 10 is provided supposing that the noise has one noise frequency. However, a plurality of frequencies may be included in the noise. In such a case, in order to reduce the plurality of noise frequencies, it is preferable that a plurality of vibrators respectively corresponding to the plurality of frequencies is provided.

Accordingly, in the second embodiment, a configuration where a plurality of vibrators is provided will be described. As an example, the case where the noise including four noise frequencies fa-fd will be described as below.

Figure 15:
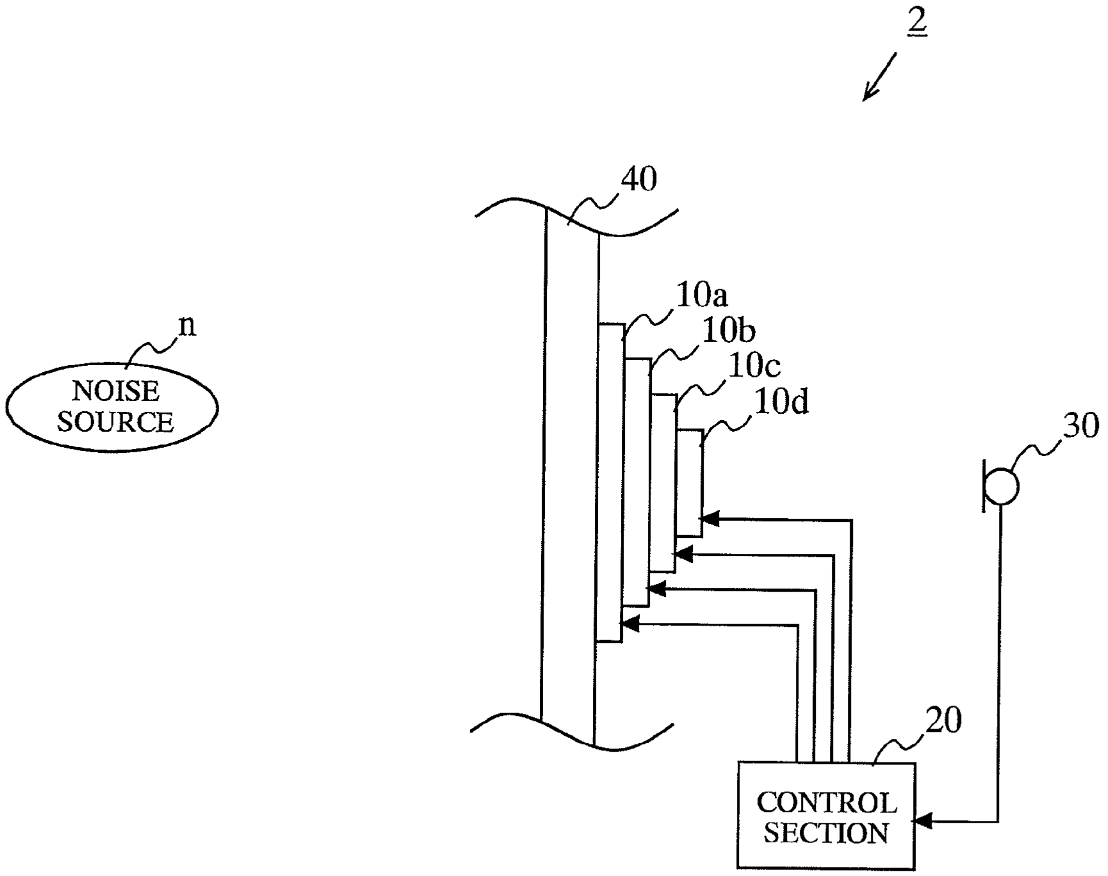
FIGS. 15 to 17 illustrate configurations of an active noise control apparatus 2 according to a second embodiment.

FIG. 15 illustrates a configuration of an active noise control apparatus 2 according to the second embodiment of the present invention. In FIG. 15, the active noise control apparatus 2 according to the second embodiment includes vibrators 10*a*-10*d*, a control section 20, and a detector 30. The active noise control apparatus 2 is different from the above-described active noise control apparatus 1 in that the plurality of vibrators 10*a*-10*d* is provided.

The plurality of vibrators 10*a*-10*d* is provided corresponding to the four noise frequencies fa-fd, respectively, which are included in the noise, and the plurality of vibrators 10*a*-10*d* is stacked on and fixed to the surface of the panel 40 in a manner based on the principle described in the first embodiment. Specifically, the vibrator 10*a* is disposed in a manner that, under conditions that noise having a frequency fa is radiated from the noise source n, edges β agree with the positions α where the sign, of the distribution of bending moment of force over the panel 40 caused by the noise vibration, is reversed. The vibrator 10*b* is disposed in a manner that, under conditions that noise having a frequency fb is radiated from the noise source n, edges β agree with the positions α where the sign, of the distribution of bending moment of force over the panel 40 caused by the noise vibration, is reversed. The vibrator 10*c* is disposed in a manner that, under conditions that noise having a frequency fc is radiated from the noise source n, edges β agree with the positions α where the sign, of the distribution of bending moment of force over the panel 40 caused by the noise vibration, is reversed. The vibrator 10*d* is disposed in a manner that, under conditions that noise having a frequency fd is radiated from the noise source n, edges β agree with the positions α where the sign, of the distribution of bending moment of force over the panel 40 caused by the noise vibration, is reversed.

Figure 16:
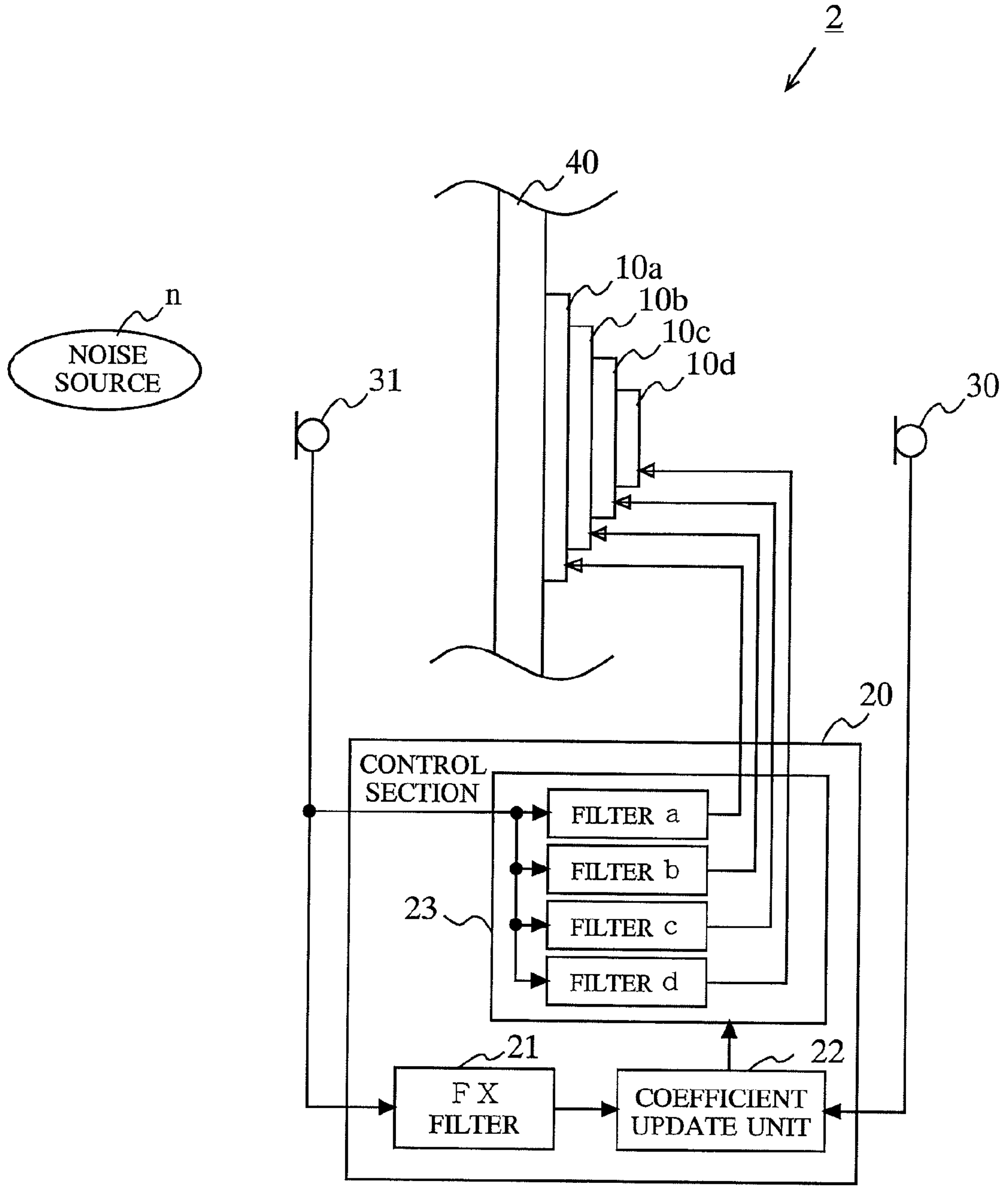

Also, in the second embodiment, a feedforward configuration can be applied as illustrated in FIG. 14. FIG. 16 illustrates an exemplary detailed configuration of the control section 20 in the feedforward configuration. The control section 20 in FIG. 16 includes an FX filter 21, a coefficient update unit 22, and an adaptive filter 23.

A detection signal in proportion to noise level detected by the detector 31 is inputted to the FX filter 21, and the FX filter 21 provides the detection signal with characteristics equivalent to transfer functions from the vibrators 10*a*-10*d* to the detector 30. The detection signal in proportion to a sound level detected by the detector 30 as an error signal, and a signal outputted from the FX filter 21 as a reference signal are inputted to the coefficient update unit 22. The coefficient update unit 22 performs calculation for coefficient update so as to always suppress the error signal correlated with the reference signal using the LMS (Least Mean Square) algorithm or the like, and updates a coefficient of the adaptive filter 23. The adaptive filter 23 includes filters a-d by frequency bands, which respectively filter the detection signals detected by the detector 31 using the coefficients updated by the coefficient update unit 22 to generate four control signals. The four control signals are outputted to the vibrators 10*a*-10*d*, respectively.

When the noise at the position of the detector 30 is represented by N and the transfer function from the vibrators 10*a*-10*d* to the detector 30 is represented by C, the characteristic of the FX filter 21 is represented by C. Here, by making the coefficient update unit 22 operate to cause the adaptive filter 23 to converge, a noise component in the output signal from the detector 30 approaches zero, so that the characteristic of the adaptive filter 23 converges to a characteristic of $-1/C$. Accordingly, an output from the adaptive filter 23 is represented by $N\times(-1/C)$ and inputted to the vibrators 10*a*-10*d*. As a result, the noise N detected by the detector 30 is synthesized with $N\times(-1/C)\times C$ by a control sound from the panel 40 to result in $N+N\times(-1/C)\times C=0$, whereby the noise at the detector 30 is reduced.

As described above, even when a plurality of noise frequencies is included, the active noise control apparatus 2 according to the second embodiment of the present invention can effectively reduce the noise having the target noise frequency, by adjusting the fixed positions of the plurality of vibrators 10*a*-10*d* without increasing the size of the apparatus.

Figure 17:
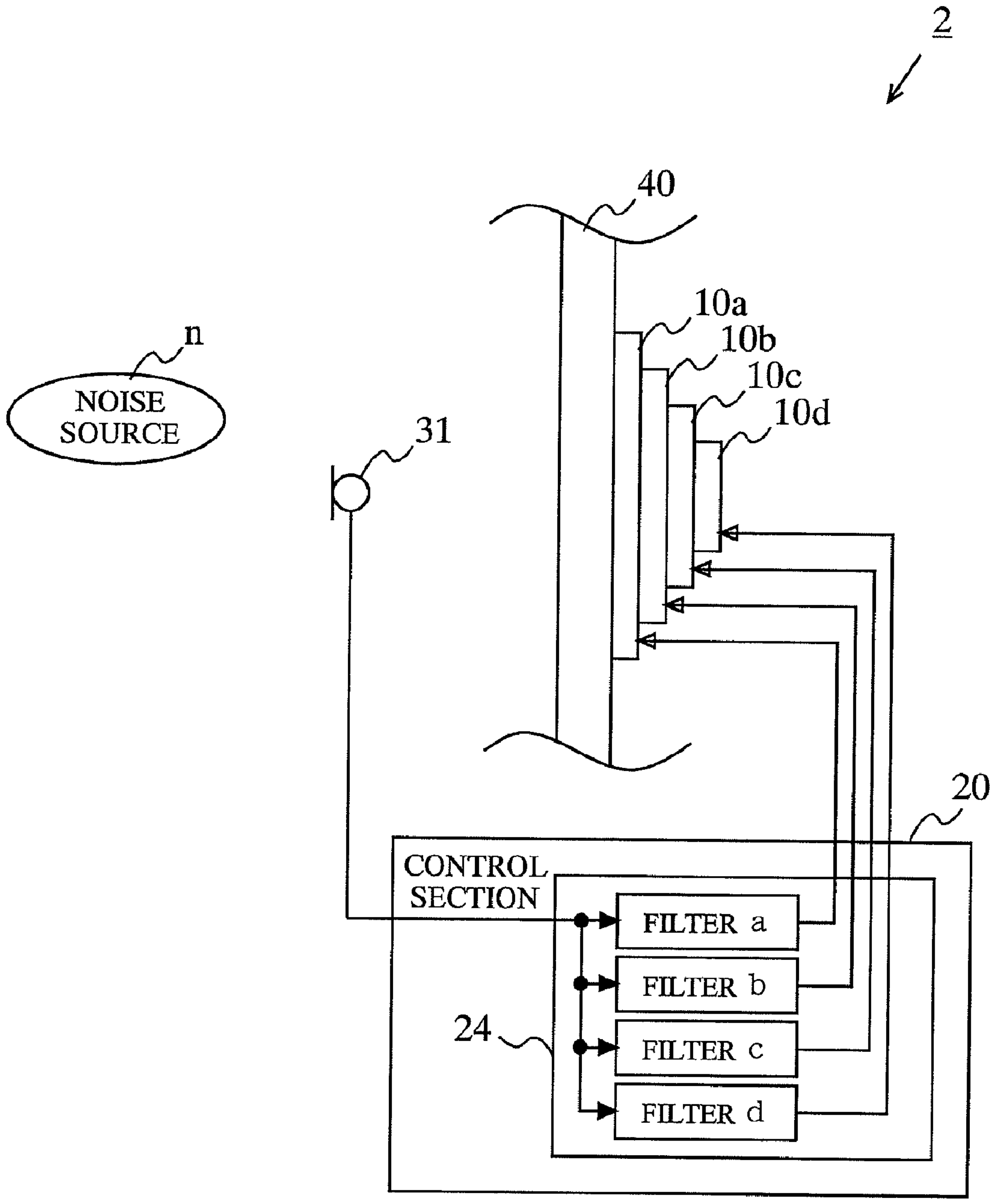

Note that since the coefficient update of the adaptive filter 23 becomes unnecessary when time change of the transfer function C is small, the detector 31 and the control section 20 including the filter 24 having −1/C characteristic can form the active noise control apparatus 2 as shown in FIG. 17.

In addition, although the detectors 30 and 31 detect sound in the above-described first and second embodiments, the similar effect can be achieved even when either one of or both of the detectors is replaced with a sensor which detects the vibration of the noise source n or of the panel 40. Further, when noise is generated based on an electric signal inputted to a noise source n (e.g., a speaker), noise can be controlled by detecting the electric signal.

<Effective Arrangement of the Vibrator>

Figure 18:
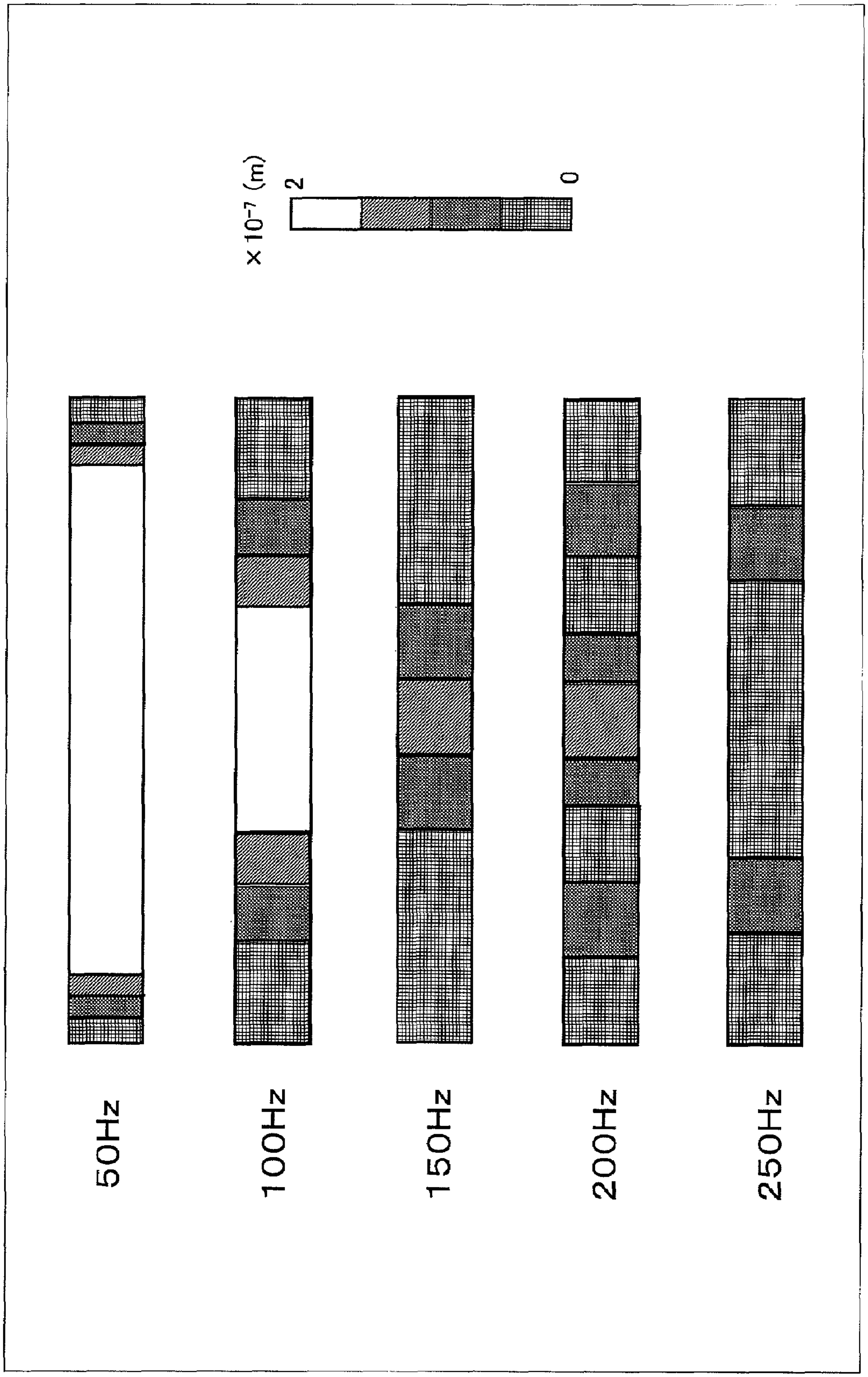
FIG. 18 illustrates a displacement of noise vibration over the panel 40.
Figure 19:
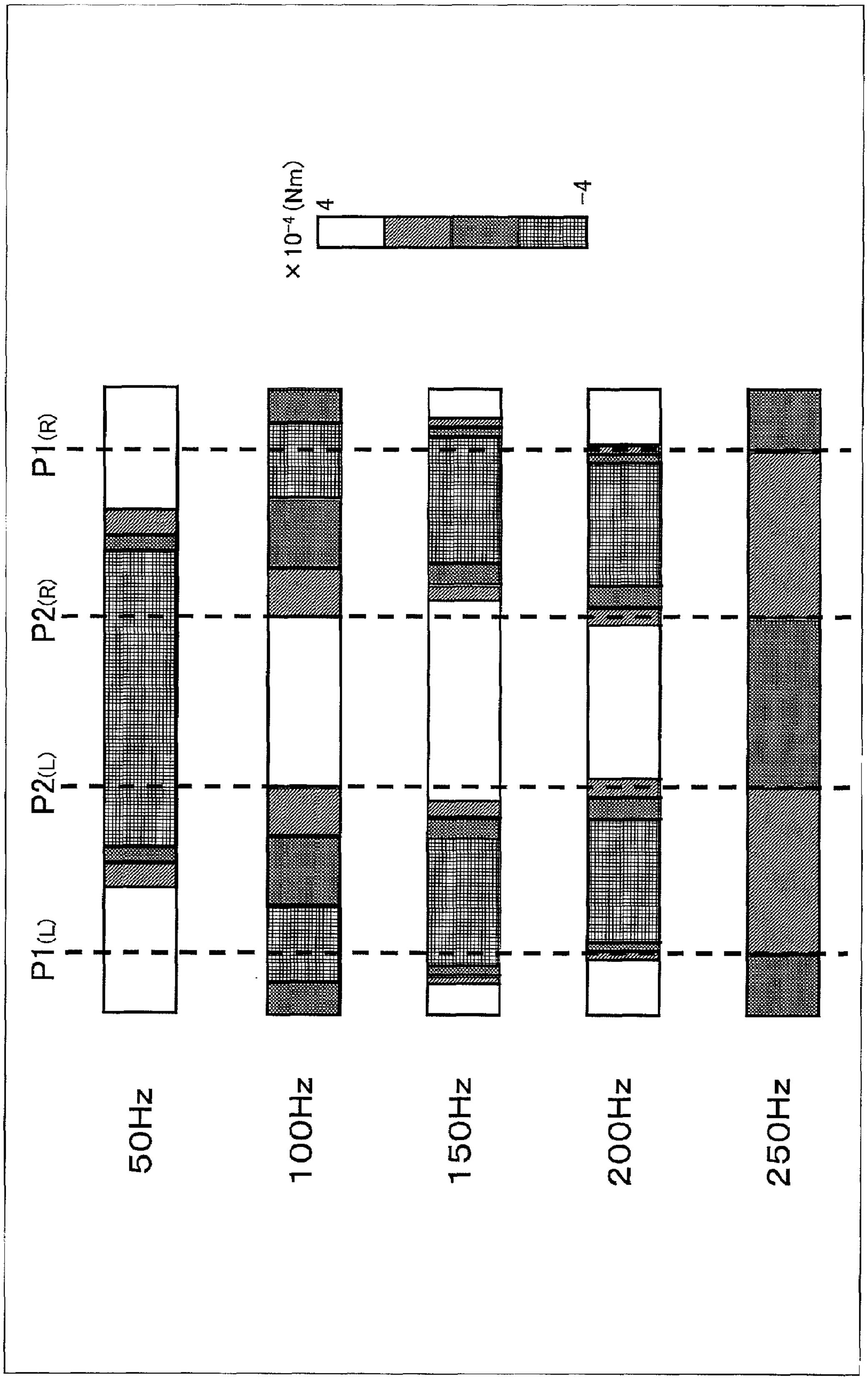
FIG. 19 illustrates distributions of a moment of force of noise vibration over the panel 40.
Figure 20:
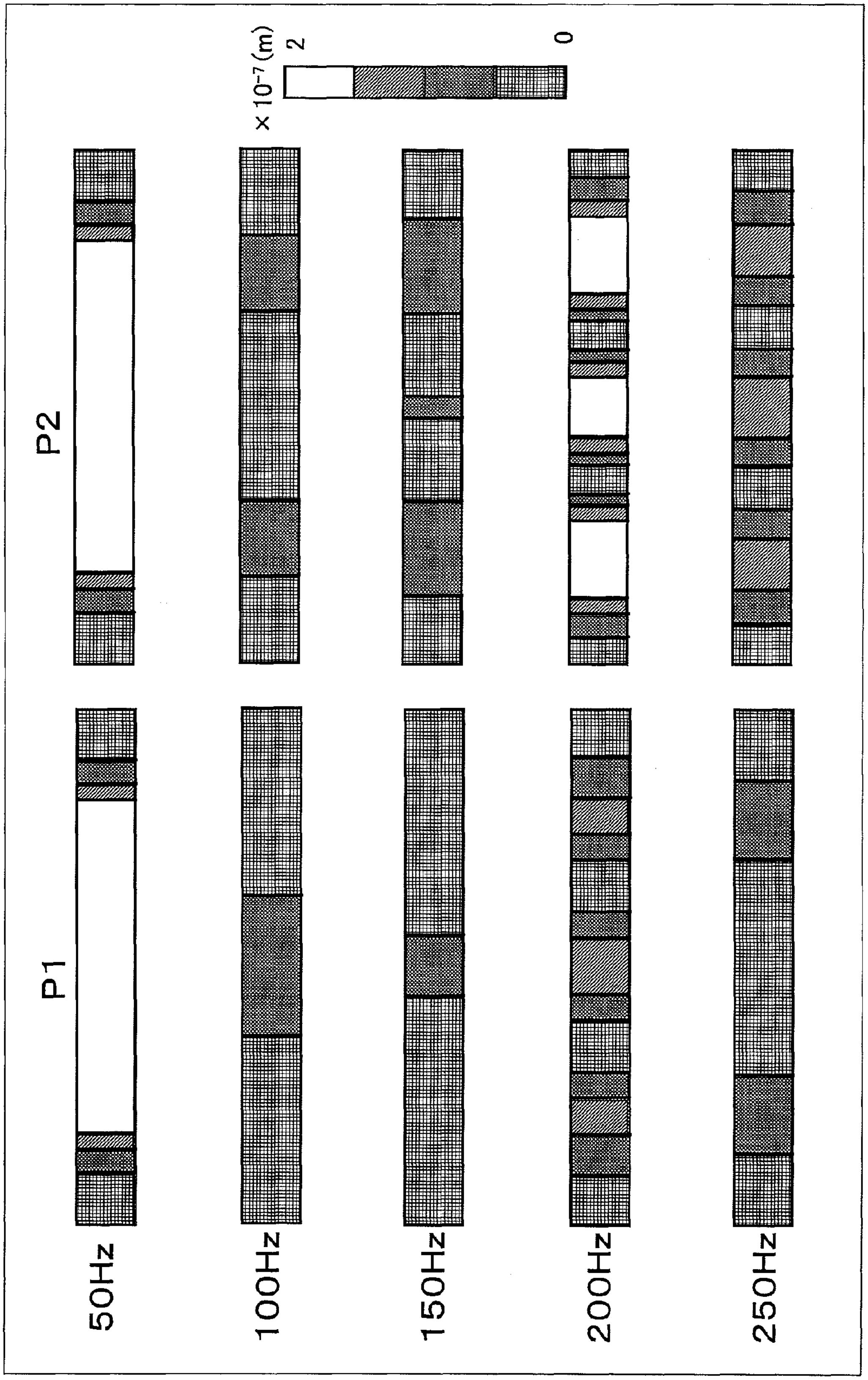
FIG. 20 illustrates distributions of a displacement of control vibration over the panel 40.

In the above-described first and second embodiments, the edges β of the vibrators 10 and 10*a*-10*d* agree with the positions α where the sign, of the distribution of bending moment of force over the panel 40 caused by the noise vibration, is reversed. However, depending on a frequency, there may be a plurality of (more than two) positions α where the sign, of the distribution of bending moment of force over the panel 40 caused by the noise vibration, is reversed. In such a case, it is preferable to design such that the edges β of the vibrator 10 at the target noise frequency agree with the outermost positions α on the panel 40. This is because, when the designing is performed in such a manner, the control vibration most appropriate to cancel the noise vibration can be achieved. FIGS. 18 to 20 illustrate analysis results based on models assuming that the above-described panel 40 is beam shaped.

As shown in FIG. 18, the genesis location of the noise vibration on the panel 40 varies depending on the noise frequencies. In addition, as shown in FIG. 19, the position where the sign is reversed on the distribution of bending moment of force over the panel 40 varies depending on the noise frequencies. Furthermore, when the noise frequency becomes higher, it can be seen that the sign is reversed at a plurality of (more than two) positions on the distribution of bending moment of force. FIG. 20 illustrates displacement distributions of the control vibration for the panel 40 when the vibrator 10 is fixed to the panel 40 in a manner that the edges β agree with positions $\mathbf{P1}_{(L)}$ and $\mathbf{P1}_{(R)}$, or with positions $\mathbf{P2}_{(L)}$ and $\mathbf{P2}_{(R)}$ illustrated in FIG. 19. It can be seen that when the edges β of the vibrator 10 agree with the outermost positions P1 on the panel 40 where the sign of the distribution of bending moment of force is reversed, the displacement distribution of the control vibration which is more approximate to the displacement distribution of the noise vibration can be obtained.

Figure 21:
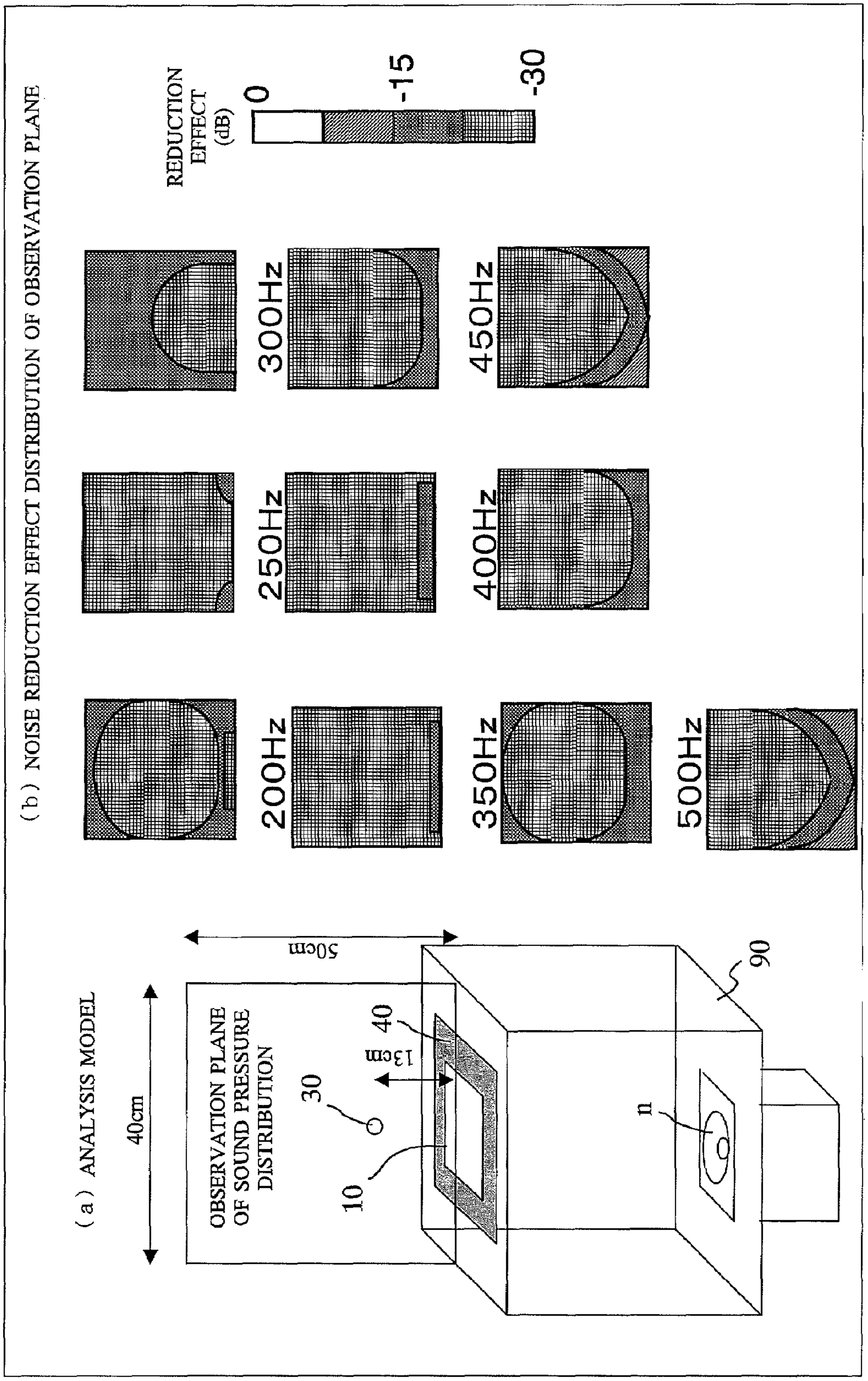
FIG. 21 illustrates an example of distributions of a noise reduction effect over the panel 40 under specific conditions.

FIG. 21 illustrates a noise reduction effect when the edges β of the vibrator 10 agree with the positions P1 shown in FIG. 19. As illustrated in FIG. 21, it can be seen that not only in the target noise frequency but also over a wide range frequency, a noise reduction effect of a wide range is achieved. This is because the positions α where the sign of the distribution of bending moment of force is reversed, appear near the periphery of the panel 40 in most noise frequencies. Accordingly, when the edges β of one vibrator 10 are disposed near the periphery of the panel 40, the positions α where the sign of the distribution of bending moment of force is reversed, appears in the vicinity in several noise frequencies whereby a noise reduction effect can be achieved.

As described above, when the edges β of the vibrator 10 agree with the outermost positions α among a plurality of (more than two) positions α on the panel 40, where the sign, of the distribution of bending moment of force over the panel 40 caused by the noise vibration, is reversed, noise reduction effects can be achieved in several frequencies other than the target noise frequency. Accordingly, if only one vibrator 10 is available due to limitation of size or of cost, then only one vibrator 10 is fixed in a manner that the edges β of the vibrator 10 agree with the outermost positions α where the sign is reversed, of the distribution of bending moment of force over the panel 40, in one noise frequency (optimally, the target noise frequency) selected from a plurality of noise frequencies. As a result, though not to the extent of the configuration using a plurality of vibrators, a control can be achieved having a noise reduction effect higher than that of the conventional configuration.

<Exemplary Configuration 1 of Active Noise Control Apparatus>

Figure 22:
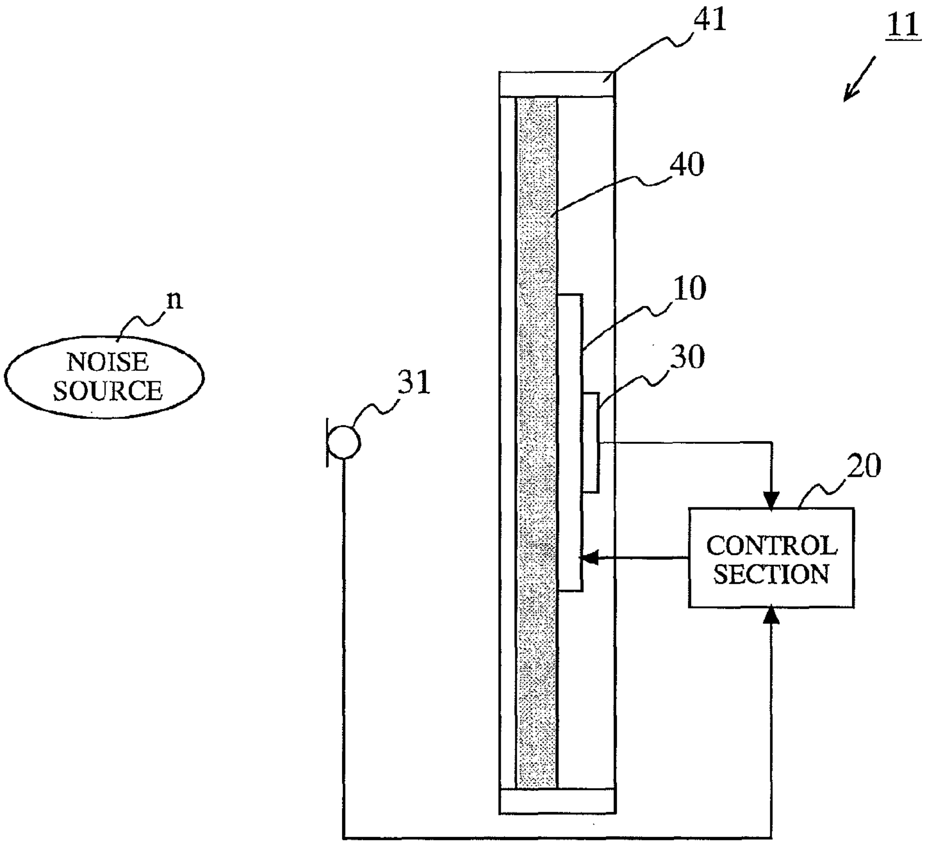
FIGS. 22 to 24 illustrate exemplary configurations using the active noise control apparatus of the present invention.
Figure 22:
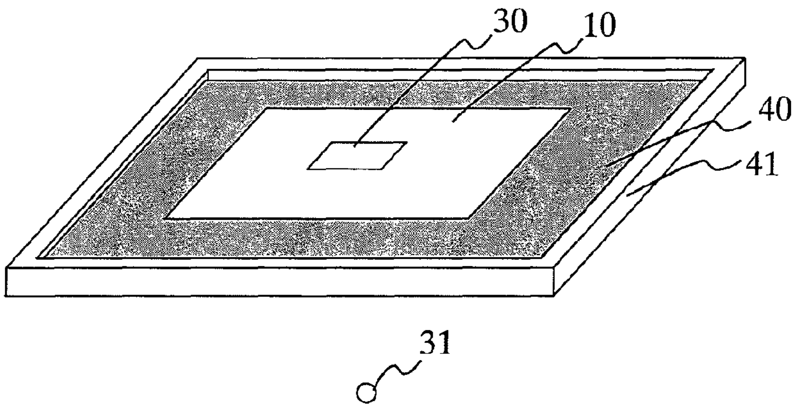

FIG. 22 illustrates an exemplary configuration 1 using the active noise control apparatus of the present invention. In the exemplary configuration 1, the panel 40 is fitted into a frame 41, and is modularized together with a control section 20, a detector 31 for detecting the incoming noise to the panel 40, and a detector 30 for detecting vibration of the panel 40. By fitting the panel 40 into the frame 41, the boundary of the panel 40 becomes fixed whereby the vibration of the panel 40 becomes stable. Accordingly, the location of the vibrator 10 to be fixed can be determined for achieving a significant noise reduction effect. In addition, when the active noise control apparatus is modularized, an active noise control apparatus which can achieve a noise reduction effect in any desired area can be designed by disposing a plurality of modules 11.

<Exemplary Configuration 2 of Active Noise Control Apparatus>

Figure 23:
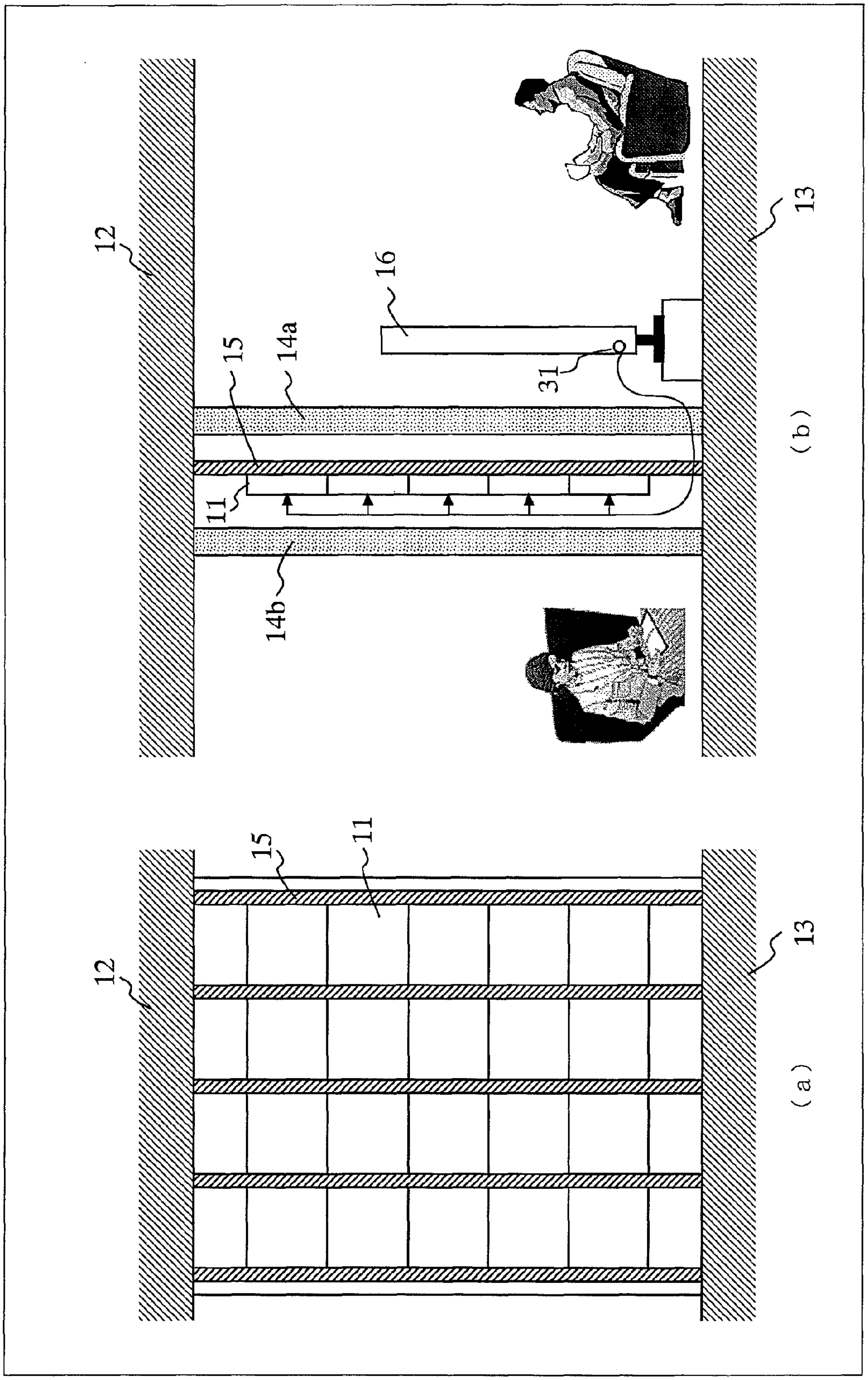

(a) of FIG. 23 illustrates an exemplary configuration 2 using the active noise control apparatus of the present invention. In the exemplary configuration 2, an active control panel includes a plurality of modules 11 of the exemplary configuration 1 in matrix. The active control panel is disposed, for example, between walls 14*a* and 14*b* of a house. The plurality of modules 11 is enclosed and fixed by a ceiling 12, a floor 13, and frames 15 for disposing modules.

(b) of FIG. 23 illustrates an example of disposing the active control panel in a wall (between the walls 14*a* and 14*b*) behind audio-video equipment 16. Sound signal of the audio-video equipment 16, for example, is inputted to a control section 20 as a signal from a detector 31. The control section 20 generates, based on a signal from a detector 30, a control signal, outputs the control signal to a vibrator 10, and controls vibration of each of the plurality of modules 11 so as to reduce the signal from the detector 30. The sound signal of the audio-video equipment 16 can be acquired from an external audio output terminal or from a microphone disposed near a speaker for reproducing sound.

Accordingly, sound reproduced by the audio-video equipment 16 is suppressed by vibration control of the panels 40 included in the plurality of modules 11, respectively, whereby a noise reduction effect can be achieved all over the next room on the side of the wall 14*b* opposite to the audio-video equipment 16. The wall where the active control panel can be disposed is not limited to the rear wall but the active control panel may be disposed in a front wall or in a floor. Further, the active noise control panel can be disposed not in the wall.

<Exemplary Configuration 3 of Active Noise Control Apparatus>

Figure 24:
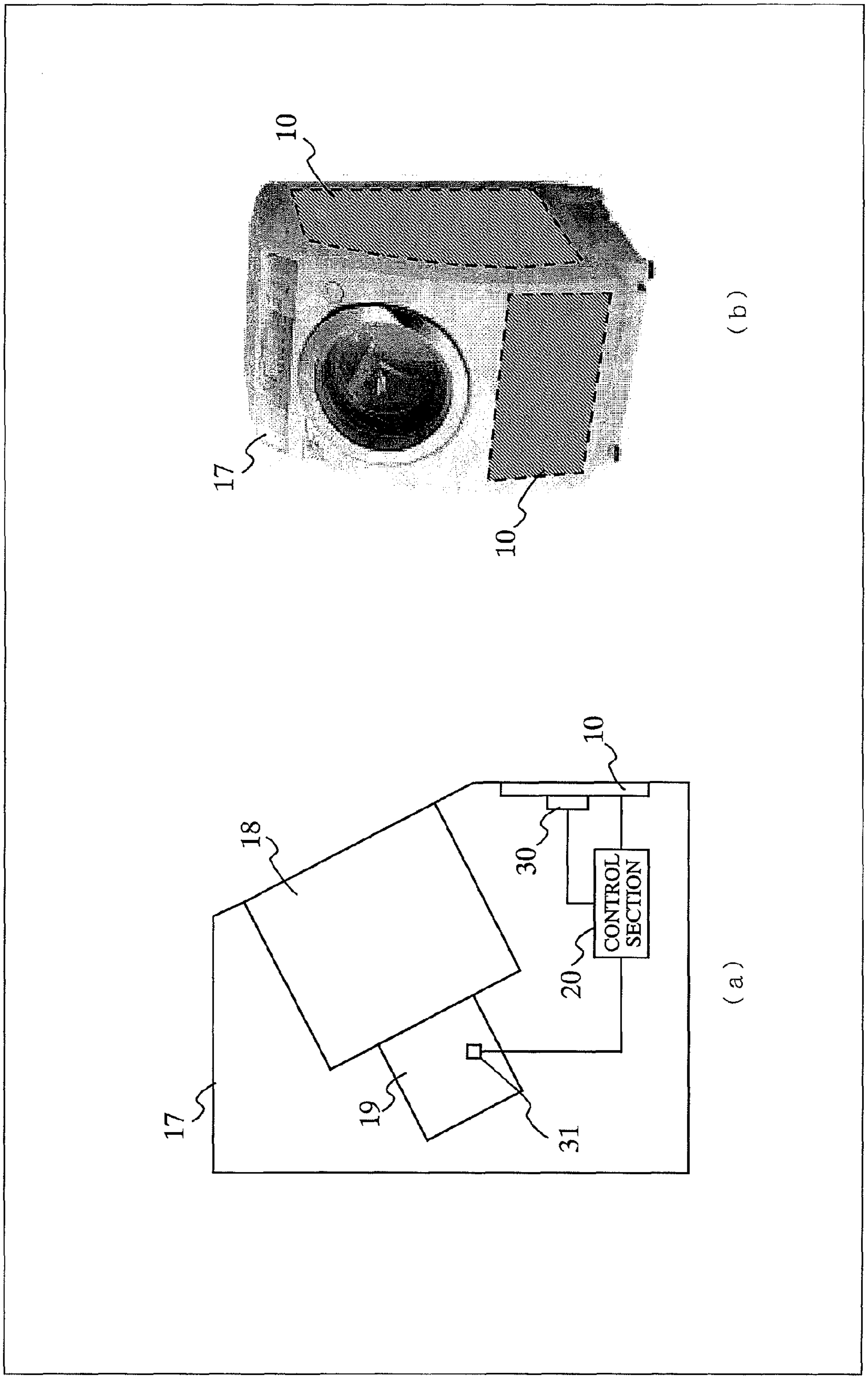
Figure 25:
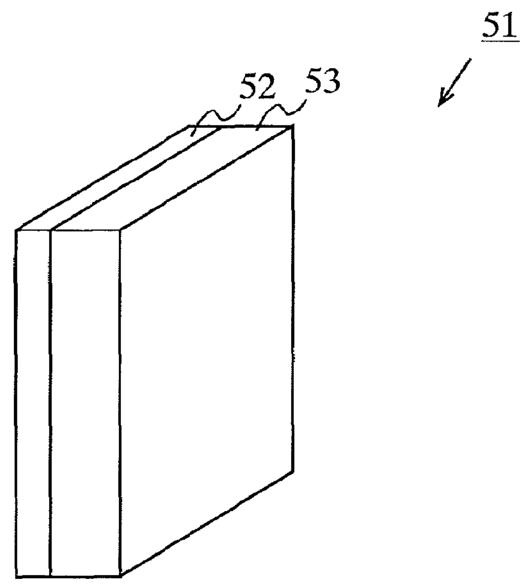
F I G. 2 5 PRIOR ART
FIGS. 25 to 28, each illustrates a configuration of a conventional sound insulation wall.
Figure 26:
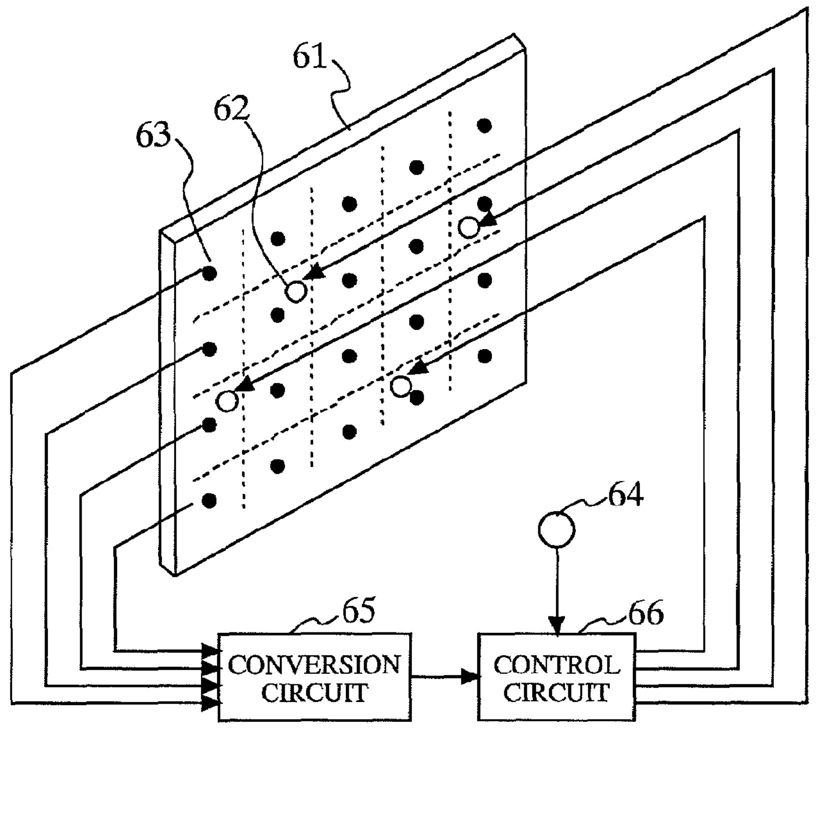
F I G. 2 6 PRIOR ART
Figure 27:
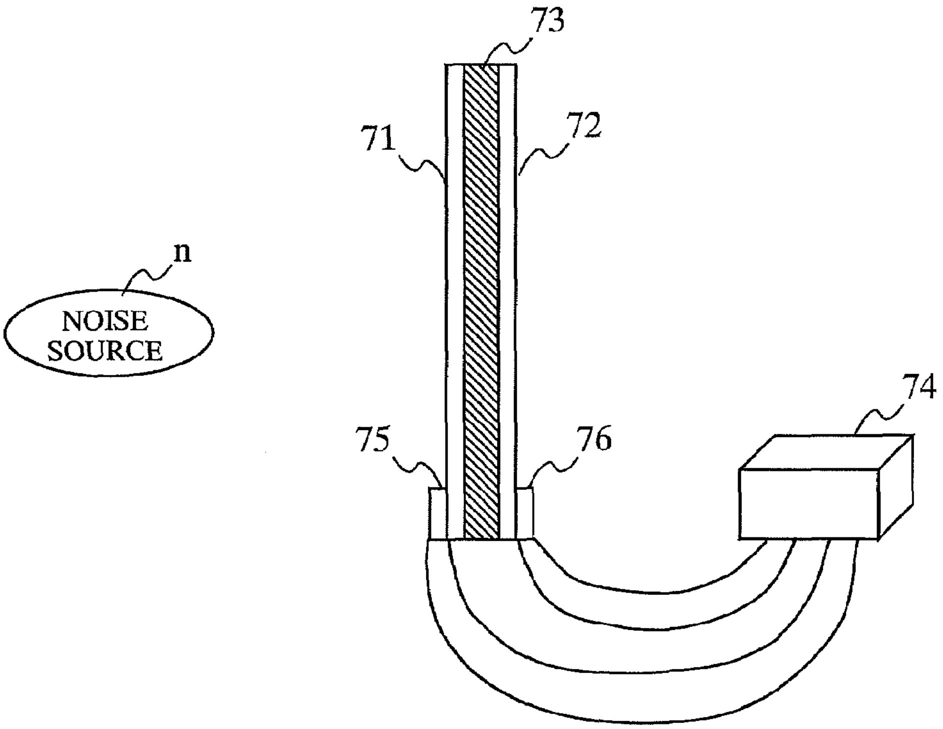
F I G. 2 7 PRIOR ART
Figure 28:
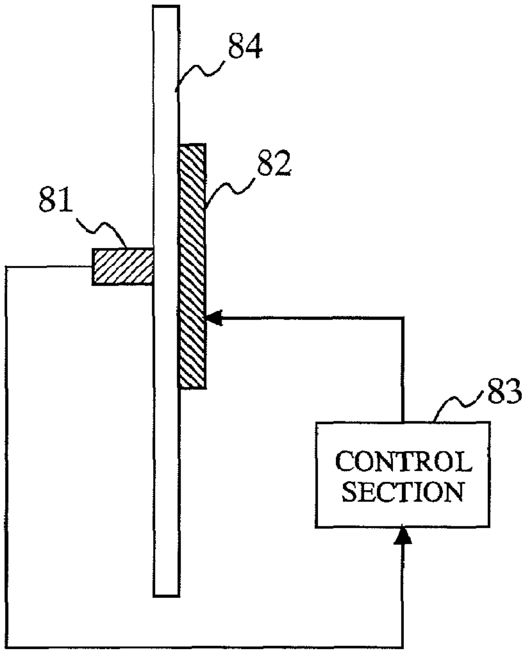
F I G. 2 8 PRIOR ART

FIG. 24 illustrates an exemplary configuration 3 using the active noise control apparatus of the present invention. In the exemplary configuration 3, a panel 40 is a cabinet panel of a laundry machine 17, and a vibrator 10 is placed directly on the cabinet panel. With this configuration, a detector 31 detects vibration or noise from a noise source of a laundry machine 17, typically from a motor 19 that rotates a washing tub 18, and a detector 30 detects vibration of the cabinet panel. A control section 20 generates, based on signals from the detectors 30 and 31, a control signal, and outputs the control signal to the vibrator 10 to reduce vibration of the cabinet panel of the laundry machine 17 due to the rotation of the motor 19. As a result, the vibration and/or sound generated inside the laundry machine 17 can be prevented from radiating to a room where the laundry machine 17 is disposed.

While the invention has been described in detail, the foregoing description is in all aspects illustrative and not restrictive. It is understood that numerous other modifications and variations can be devised without departing from the scope of the invention.

What is claimed is:

1. An active noise control apparatus for suppressing a noise vibration of a panel generated by noise radiated from a noise source, the active noise control apparatus comprising:

a flat-plate vibrator, which is fixed to the panel, for exciting a control vibration at the panel, the control vibration having a vibration direction opposite to a vibration direction of the noise vibration of the panel, and the control vibration being excited by the flat-plate vibrator in accordance with a control signal;

a detector for detecting one of a propagation sound generated by the noise vibration of the panel and a vibration of the panel, and for outputting a result of the detecting; and a control section for generating, based on the result of the detecting by the detector, the control signal according to which the flat-plate vibrator excites the control vibration for suppressing the noise vibration of the panel, wherein the flat-plate vibrator is disposed on the panel, such that edges of the flat-plate vibrator are respectively aligned with positions on the panel where a sign, of a distribution of a bending moment of force over the panel caused by the noise vibration, reverses.

2. The active noise control apparatus according to claim 1, wherein the flat-plate vibrator is disposed on the panel, such that the edges of the flat-plate vibrator are respectively aligned with outermost positions on the panel from among the positions on the panel where the sign, of the distribution of the bending moment of force over the panel caused by the noise vibration, reverses.

3. The active noise control apparatus according to claim 1, wherein the detector further detects one of the noise radiated from the noise source and a vibration of the noise source.

4. The active noise control apparatus according to claim 1, wherein the flat-plate vibrator is a piezoelectric material exhibiting a dynamic change according to the control signal.

5. An active noise control apparatus for suppressing a noise vibration of a panel generated by noise radiated from a noise source, the active noise control apparatus comprising:

a plurality of flat-plate vibrators stacked on and fixed to the panel, the plurality of flat-plate vibrators being for exciting a control vibration at the panel, the control vibration having a vibration direction opposite to a vibration direction of the noise vibration of the panel, and the control vibration being excited by the plurality of flat-plate vibrators in accordance with a plurality of respective control signals;

a detector for detecting one of a propagation sound generated by the noise vibration of the panel and a vibration of the panel, and for outputting a result of the detecting; and a control section for generating, based on the result of the detecting by the detector, the plurality of respective control signals according to which the plurality of flat-plate vibrators respectively excites the control vibration for suppressing the noise vibration of the panel, wherein each of the plurality of flat-plate vibrators is disposed on the panel, such that edges of each of the plurality of flat-plate vibrators are respectively aligned with positions on the panel where a sign, of a distribution of a bending moment of force over the panel caused by the noise vibration excited based on one of frequencies included in the noise, reverses.

6. The active noise control apparatus according to claim 5, wherein each of the plurality of flat-plate vibrators is disposed on the panel, such that the edges of each of the plurality of flat-plate vibrators are respectively aligned with outermost positions on the panel from among the positions on the panel where the sign, of the distribution of the bending moment of force over the panel caused by the noise vibration excited based on one of the frequencies included in the noise, reverses.

7. The active noise control apparatus according to claim 5, wherein the detector further detects one of the noise radiated from the noise source and a vibration of the noise source.

8. The active noise control apparatus according to claim 5, wherein one flat-plate vibrator of the plurality of flat-plate vibrators is a piezoelectric material exhibiting a dynamic change according to a respective control signal of the plurality of respective control signals.

9. The active noise control apparatus according to claim 1, further comprising a flat-plate panel with a periphery that is fixed in a frame, wherein a module includes the flat-plate panel, the flat-plate vibrator, the detector, and the control section.

10. The active noise control apparatus according to claim 9, wherein a plurality of modules is arranged in a matrix.

11. An active noise control system comprising:

audio-video equipment; and an active noise control apparatus of disposed between two neighboring rooms, the audio-video equipment being disposed in one of the two neighboring rooms, wherein the active noise control apparatus includes:

a flat-plate vibrator, which is fixed to a panel of the audio-video equipment, for exciting a control vibration at the panel, the control vibration having a vibration direction opposite to a vibration direction of a noise vibration of the panel generated by noise radiated from the audio-video equipment, and the control vibration being excited by the flat-plate vibrator in accordance with a control signal;

a detector for detecting a sound signal of the audio-video equipment; and a control section for generating, based on the sound signal detected by the detector, the control signal according to which the flat-plate vibrator excites the control vibration for suppressing the noise vibration of the panel, and wherein the flat-plate vibrator is disposed on the panel, such that edges of the flat-plate vibrator are respectively aligned with positions on the panel where a sign, of a distribution of a bending moment of force over the panel caused by the noise vibration, reverses.

12. An active noise control system comprising:

a laundry machine; and an active noise control apparatus, wherein the active noise control apparatus includes:

a flat-plate vibrator, which is fixed to a cabinet panel of the laundry machine, for exciting a control vibration at the cabinet panel, the control vibration having a vibration direction opposite to a vibration direction of a noise vibration of the cabinet panel generated by noise radiated from a motor of the laundry machine, and the control vibration being excited by the flat-plate vibrator in accordance with a control signal;

a detector for detecting one of (i) a sound from the motor and the cabinet panel and (ii) a vibration from the motor and the cabinet panel, and for outputting a result of the detecting; and a control section for generating, based on the result of the detecting by the detector, the control signal according to which the flat-plate vibrator excites the control vibration for suppressing the noise vibration of the cabinet panel, and wherein the flat-plate vibrator is disposed on the cabinet panel, such that edges of the flat-plate vibrator are respectively aligned with positions on the cabinet panel where a sign, of a distribution of a bending moment of force over the cabinet panel caused by the noise vibration, reverses.

* * * * *